(12) United States Patent
Chen et al.

(10) Patent No.: US 12,205,899 B2
(45) Date of Patent: Jan. 21, 2025

(54) METHOD OF MAKING SEMICONDUCTOR DEVICE INCLUDING BURIED CONDUCTIVE FINGERS

(71) Applicant: TAIWAN SEMICONDUCTOR MANUFACTURING COMPANY, LTD., Hsinchu (TW)

(72) Inventors: Chih-Liang Chen, Hsinchu (TW); Guo-Huei Wu, Hsinchu (TW); Li-Chun Tien, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 18/448,028

(22) Filed: Aug. 10, 2023

(65) Prior Publication Data

US 2023/0387016 A1    Nov. 30, 2023

Related U.S. Application Data

(62) Division of application No. 17/108,752, filed on Dec. 1, 2020, now Pat. No. 12,027,461.

(Continued)

(51) Int. Cl.
*H01L 23/528* (2006.01)
*G06F 30/392* (2020.01)
(Continued)

(52) U.S. Cl.
CPC ........ *H01L 23/5286* (2013.01); *G06F 30/392* (2020.01); *G06F 30/3953* (2020.01); *G06F 2119/06* (2020.01)

(58) Field of Classification Search
None
See application file for complete search history.

(56) References Cited

U.S. PATENT DOCUMENTS 6,159,841 A   12/2000   Williams et al.
6,385,430 B1   5/2002   Jackson
(Continued)

FOREIGN PATENT DOCUMENTS

DE          69533691        2/2006
DE        112016007503      2/2020
(Continued)

OTHER PUBLICATIONS

Office Action dated Jul. 28, 2022 for corresponding case No. KR 10-2021-0012545. (pp. 1-3) English translation attached on p. 1.
(Continued)

*Primary Examiner* — Hrayr A Sayadian
(74) *Attorney, Agent, or Firm* — Hauptman Ham, LLP

(57) ABSTRACT

A semiconductor device includes a semiconductor substrate with active regions and a first buried metal layer provided below the semiconductor substrate. The first buried metal layer includes a first buried conductive rail, a first set of buried conductive fingers that extends from the first buried conductive rail, and a second set of buried conductive fingers that are interleaved with the first set of buried conductive fingers. The first set and the second set of buried conductive fingers extends beneath more than one of the active regions. In this manner, the first set and the second set of buried conductive fingers can be utilized to distribute different voltages, such as an ungated reference voltage TVDD and a gated reference voltage VVDD in a header circuit with reduced resistance.

20 Claims, 13 Drawing Sheets

Related U.S. Application Data

(60) Provisional application No. 63/024,203, filed on May 13, 2020.

(51) Int. Cl.
    *G06F 30/3953*     (2020.01)
    *G06F 119/06*     (2020.01)

(56) References Cited

U.S. PATENT DOCUMENTS

| | | |
|---|---|---|
| 7,260,442 B2 | 8/2007 | Hwang et al. |
| 8,674,440 B2 | 3/2014 | Korec et al. |
| 9,256,709 B2 | 2/2016 | Yu et al. |
| 9,923,073 B2 | 3/2018 | Nakano et al. |
| 2008/0150082 A1 | 6/2008 | Zupac et al. |
| 2009/0152649 A1 | 6/2009 | Kim |
| 2012/0126406 A1 | 5/2012 | Dix |
| 2013/0321100 A1 | 12/2013 | Wang |
| 2014/0040838 A1 | 2/2014 | Liu et al. |
| 2015/0041917 A1 | 2/2015 | Zhu |
| 2015/0278429 A1 | 10/2015 | Chang |
| 2016/0225709 A1 | 8/2016 | Roy et al. |
| 2017/0090622 A1* | 3/2017 | Badaye ............ G06F 3/0448 |
| 2020/0019671 A1 | 1/2020 | Lin et al. |
| 2020/0027849 A1 | 1/2020 | Trang et al. |

FOREIGN PATENT DOCUMENTS

| | | |
|---|---|---|
| KR | 20090064747 | 6/2009 |
| KR | 20200008529 | 1/2020 |
| KR | 20200011035 | 1/2020 |
| WO | 2018237106 | 12/2018 |

OTHER PUBLICATIONS

Nathan, Arokia, et al. "Flexible electronics: the next ubiquitous platform." Proceedings of the IEEE 100.Special Centennial Issue (2012): 1486-1517.

Office Action dated Jan. 18, 2022 for corresponding case No. TW 11120063850. (pp. 1-4).

Office Action dated Jan. 21, 2022 for corresponding case No. DE 10 2020 132 602.5 (pp. 1-12).

Office Action dated Dec. 29, 2021 for corresponding case No. 10-2021-0012545. (pp. 1-4).

* cited by examiner

METHOD OF MAKING SEMICONDUCTOR DEVICE INCLUDING BURIED CONDUCTIVE FINGERS

PRIORITY CLAIM

The instant application is a divisional application of U.S. application Ser. No. 17/108,752, filed Dec. 1, 2020, now U.S. Pat. No. 12,027,461, issued Jul. 2, 2024, which claims priority to Provisional Application No. 63/024,203, filed May 13, 2020, the entire contents of each of which are incorporated by reference herein.

BACKGROUND

The semiconductor integrated circuit (IC) industry has produced a wide variety of analog and digital devices to address issues in a number of different areas. As ICs have become smaller and more complex, operating voltages of these analog and digital devices are reduced affecting the operating voltages of these digital devices and overall IC performance. Furthermore, power consumption in these analog and digital devices can increase due to leakage currents. Header circuits use power gating to turning off power supplied to circuits within the IC not being used. Reducing the resistance of header circuits has a benefit of reducing the overall power consumption of the IC.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
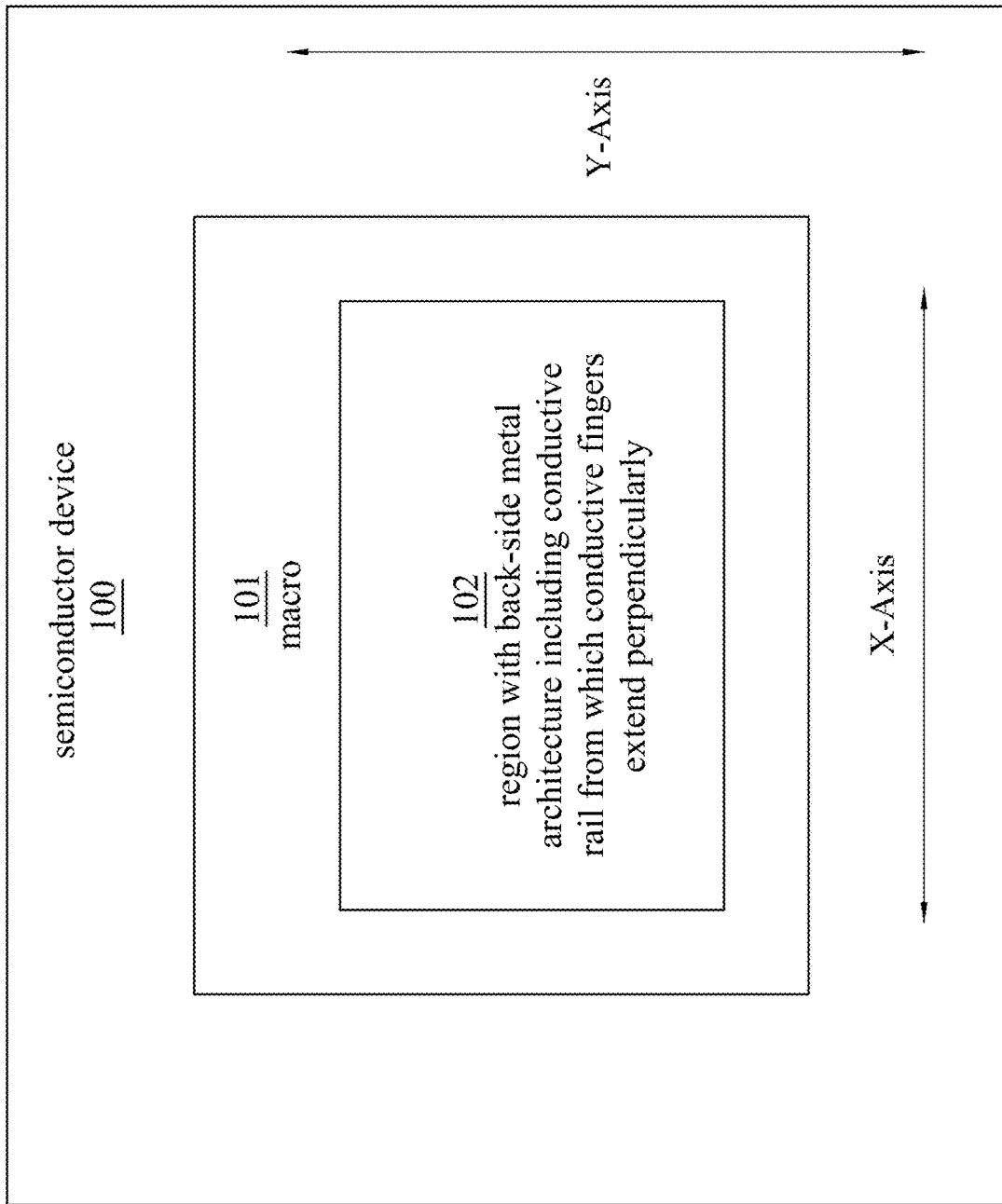
FIG. 1 is a block diagram of a semiconductor device, in accordance with some embodiments of the present disclosure.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a semiconductor device includes a semiconductor substrate including active regions, each active region having a long axis extending in a first direction. A first buried metal layer is below the semiconductor substrate. The first buried metal layer includes a first buried conductive rail having a long axis extending in the first direction. In some embodiments, the first buried conductive rail is configured to transmit a first reference voltage (e.g., a gated version of VDD referred to herein as VVDD). Furthermore, in some embodiments the semiconductor device includes a first set of buried conductive fingers, each of which extends from the first buried conductive rail and each of which has a long axis extending in a second direction that is substantially orthogonal to the first direction. Each buried conductive finger in the first set extends beneath more than one of the active regions. In this manner, VVDD is provided to appropriate locations/portions of corresponding ones of active regions. The first buried metal layer also includes a second set of buried conductive fingers. Each buried conductive finger in the second set has a long axis extending in the second direction and extending beneath more than one of the active regions. The second set of buried conductive fingers is interleaved with the first set of buried conductive fingers. In some embodiments, the second set of buried conductive fingers is used to distribute a second reference voltage (e.g., an ungated version of VVDD referred to herein as TVDD) to appropriate locations/portions of corresponding ones of active regions. According to another approach, a first buried metal layer is provided that includes only buried conductive rails, each of which has a long axis that extends in the first direction, and where the other approach does not include fingers extending in the second direction from the conductive rails. By using buried conductive fingers extending in the second direction in accordance with some embodiments, more locations/portions of corresponding ones of active regions are available for connection/coupling correspondingly to VVDD or TVDD as compared to the other approach. As such, using buried conductive fingers extending in the second direction in accordance with some embodiments makes it easier to distribute VVDD and/or TVDD throughout the semiconductor device, and in particular throughout a header circuit, because the increased number of locations/portions of corresponding ones of active regions are available for connection/coupling correspondingly to VVDD or TVDD reduces corresponding resistive loads.

FIG. 1 is a block diagram of a semiconductor device 100 in accordance with an embodiment of the present disclosure.

In FIG. 1, semiconductor device 100 includes, among other things, a circuit macro (hereinafter, macro) 101. In some embodiments, macro 101 is a header circuit. In some embodiments, macro 101 is a macro other than a header circuit. Macro 101 includes, among other things, a region 102 with a back-side metal architecture including a conductive rail from which conductive fingers extend substantially perpendicularly. As explained below, the conductive fingers increase the area available for making connections to conductive segments which provide different voltages in a power-gating scheme. The region 102 includes metal layers and interconnection layers (the latter including via structures) beneath the semiconductor substrate (where "beneath" is relative to the Z-direction-not shown in FIG. 1), also referred to as "buried" metal layers and "buried" vias. In some embodiments, the region 102 has conductive fingers buried beneath the semiconductor substrate that are utilized to receive different reference voltages (e.g., VVDD, TVDD).

Figure 2A:
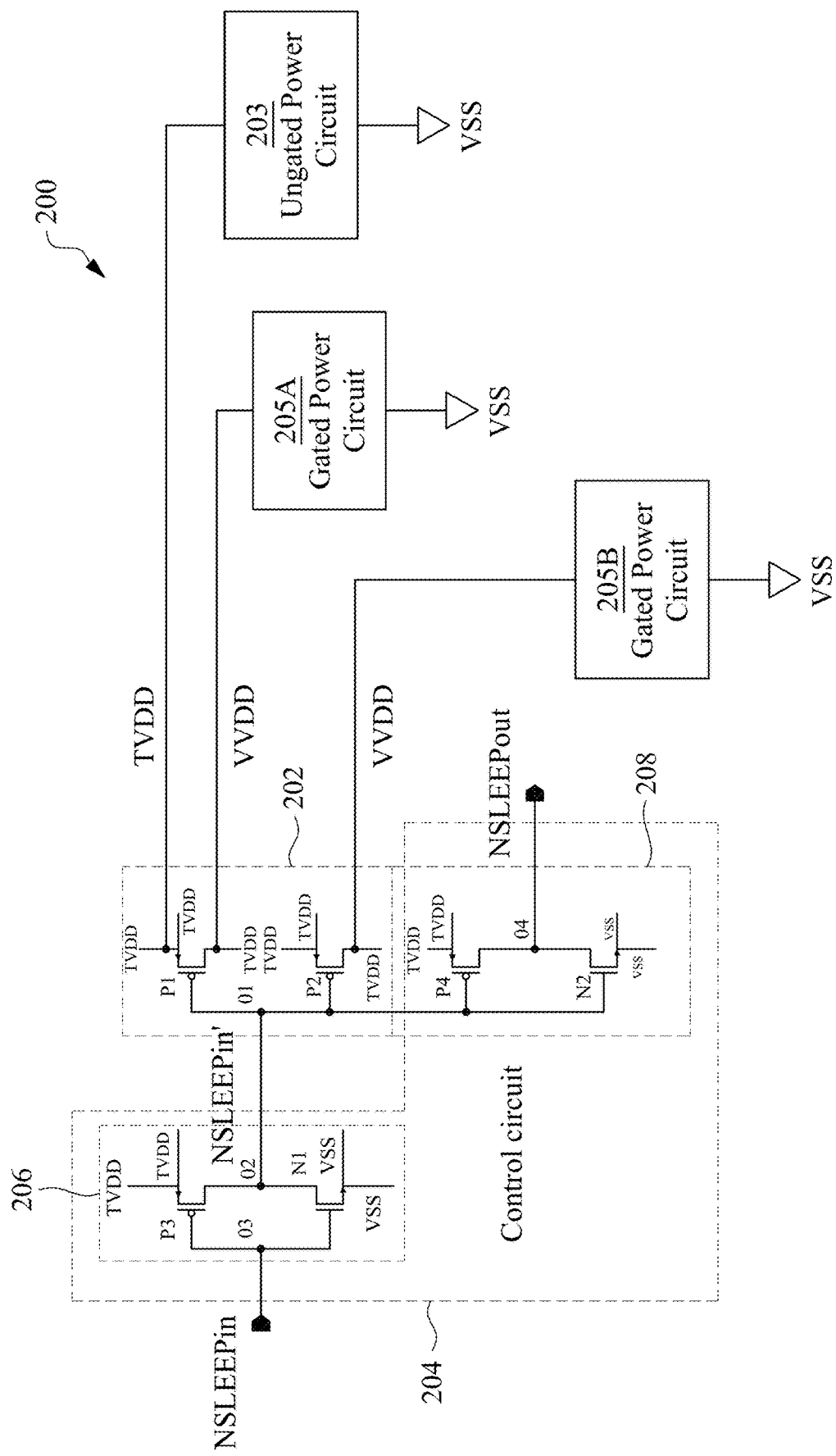
FIG. 2A is a circuit diagram, in accordance with some embodiments.

FIG. 2A is an integrated circuit (IC) 200, in accordance with some embodiments.

IC 200 is an example of a circuit usable in region 102 described above. As such, IC 200 is one example of a circuit that benefits from using a back-side metal architecture (see FIGS. 2A-2E, 3, 4A-4B, or the like) including a conductive rail from which conductive fingers extend substantially perpendicularly.

IC 200 includes: a header circuit 202; an ungated power circuit 203; a gated power circuit 205A; a gated power circuit 205B; and a control circuit 204. In general, power consumption by a circuit increases due to leakage currents. Power gating is a technique to reduce power consumption in circuits within an IC by turning off power supplied to circuits within the IC which are not being used. The power provided to each of gated power circuits 205A & 205B is gated by corresponding portions of header circuit 202, hence each of circuits 205A & 205B is referred to herein as a gated power circuit. The power provided to ungated power circuit 203 is not gated by a corresponding header circuit, hence circuit 203 is referred to herein as an ungated power circuit.

Each of gated power circuits 205A & 205B is a type of circuit which is configured to operate in a normal mode, and in a sleep mode, standby more, or the like. In the normal mode, power is provided to each of gated power circuits 205A & 205B. In the normal mode, each of gated power circuits 205A & 205B is being used by IC 200 and is either active or inactive, with more power being consumed when active than when inactive. Though less power is consumed when each of gated power circuits 205A & 205B is in use albeit inactive, nevertheless significant power is consumed due to leakage currents. In the sleep mode, standby more, or the like, each of gated power circuits 205A & 205B is not being used and so power is temporarily cut off from each of gated power circuits 205A & 205B. Accordingly, in the sleep mode, standby mode, or the like, each of gated power circuits 205A & 205B not only is inactive, but each of circuits 205A & 205B also does not suffer leakage currents. A more detailed description of a header circuit and its relation to a gated power circuit and an ungated power circuit may be found in U.S. Patent Publication No. 2020/0019671 A1, entitled "Integrated Circuit and Method of Forming the Same," which is incorporated herein by reference in its entirety.

Header circuit 202 includes a PMOS transistor P1 and a PMOS transistor P2. A source of PMOS transistor P1 and a source of PMOS transistor P2 are both configured to receive an ungated version of a reference voltage, e.g., VDD. In FIG. 2A, the ungated version of VDD is referred to as true VDD (TVDD). Furthermore, a body contact of PMOS transistor P1 and a body contact of PMOS transistor P2 are configured to receive ungated reference voltage TVDD. When transistors P1 and P2 correspondingly are turned on, a drain of PMOS transistor P1 and a drain of PMOS transistor P2 provide a gated version of TVDD correspondingly to gated power circuits 205A & 205B. The gated version of TVDD is referred to as virtual VDD (VVDD) in FIG. 2A. Assuming that a source-drain voltage drop (Vsd) for each of transistors P1 and P2 is sufficiently small as to be regarded as negligible, VVDD=TVDD−Vsd≈TVDD, and thus VVDD is substantially similar to TVDD. When transistors P1 and P2 correspondingly are turned OFF, power is cut off correspondingly to gated power circuits 205A and 205B.

A gate of PMOS transistor P1 and a gate of PMOS transistor P2 are both connected to a node O1 and are configured to receive a control signal NSLEEPin'. Header circuit 202 is, and more particularly each of transistors P1 and P2 are, configured to be turned on and off based on control signal NSLEEPin'. It should be noted that header circuit 202 may have a different configuration than the embodiment shown in FIG. 2A. For example, in some alternative embodiments, header circuit 202 has a single PMOS transistor, e.g., P1, which provides VVDD to each of gated power circuits 205A & 205B. In such an alternative embodiment in which the current-sourcing capacity of the transistor P1 is sufficient to source each of gated power circuits 205A & 205B, the use of single transistor P1 reduces the area consumed by header circuit 202.

Control circuit 204 includes a first inverter 206 and a second inverter 208. First inverter 206 is configured to receive control signal NSLEEPin and to invert the same so as to generate control signal NSLEEPin'. Thus, if control signal NSLEEPin is received in a high voltage state (e.g., at or near TVDD), then first inverter 206 is configured to generate control signal NSLEEPin' at a low voltage state (e.g., at or near VSS). If control signal NSLEEPin is received in a low voltage state (e.g., at or near VSS), then first inverter 206 is configured to generate control signal NSLEEPin' at a low voltage state (e.g., at or near TVDD).

In this embodiment, first inverter 206 includes a PMOS transistor P3 and an NMOS transistor N1. PMOS transistor P3 has a source connected to receive ungated reference voltage TVDD and a drain connected to node O2. A body contact of PMOS transistor P3 is connected to receive ungated reference voltage TVDD. Node O2 is connected to node O1 of header circuit 202. NMOS transistor N1 has a drain connected to node O2 and a source connected to receive a reference voltage VSS (e.g., a ground voltage). A body contact of NMOS transistor N1 is connected to receive a reference voltage VBB. A gate contact of PMOS transistor P3 and a gate contact of NMOS transistor N1 are both connected to node O3. Control signal NSLEEPin is received at node O3.

Accordingly, if control signal NSLEEPin is received in a low voltage state (e.g., at or near VSS), PMOS transistor P3 turns on and NMOS transistor N1 shuts off. PMOS transistor P3 thus pulls the voltage at node O2 up at or near TVDD so that control signal NSLEEPin' is provided at or near TVDD. As such, the voltage at node O1 is in the high voltage state at or near TVDD. Accordingly, PMOS transistor P1 and PMOS transistor P2 are shut off and thus power is cut off correspondingly to gated power circuits 205A and 205B.

On the other hand, if control signal NSLEEPin is in a high voltage state (at or near TVDD), PMOS transistor P3 shuts off and NMOS transistor N1 turns on. NMOS transistor N1 thus pulls the voltage at node O2 down at or near VSS so that control signal NSLEEPin' is at or near VSS. As such, node O1 is in the low voltage state at or near VSS. Accordingly, PMOS transistor P1 and PMOS transistor P2 are turned on to provide gated reference voltage VVDD to gated power circuits 205A & 205B.

Second inverter 208 is configured to generate control signal NSLEEPout from control signal NSLEEPin'. More specifically, second inverter 208 is configured to invert control signal NSLEEPin' and generate control signal NSLEEPout. Thus, if control signal NSLEEPin' is received in a high voltage state (e.g., at or near TVDD), second inverter 208 is configured to generate control signal NSLEEPout at a low voltage state (e.g., at or near VSS). If control signal NSLEEPin' is received in a low voltage state (e.g., at or near VSS), second inverter 208 is configured to generate control signal NSLEEPout at a high voltage state (e.g., at or near TVDD).

In this embodiment, second inverter 208 includes a PMOS transistor P4 and an NMOS transistor N2. PMOS transistor P4 has a source connected to receive ungated reference voltage TVDD and a drain connected to node O4. A body contact of PMOS transistor P4 is connected to receive ungated reference voltage TVDD. NMOS transistor N2 has a drain connected to node O4 and a source connected to receive a reference voltage VSS (e.g., a ground voltage). A body contact of NMOS transistor N2 is connected to receive reference voltage VBB. A gate contact of PMOS transistor P4 and a gate contact of NMOS transistor N2 are both connected to node O1. Control signal NSLEEPin' is provided at node O1.

Accordingly, if control signal NSLEEPin' is in a low voltage state (e.g., at or near VSS), then PMOS transistor P4 turns on and NMOS transistor N2 shuts off. PMOS transistor P4 thus pulls the voltage at node O4 up at or near TVDD so that control signal NSLEEPout is at or near TVDD. As such, the voltage at node O4 is in the high voltage state at or near TVDD. In this manner, control signal NSLEEPout indicates that header circuit 202 is turned on and is providing gated control voltage VVDD to gated power circuits 205A & 205B.

On the other hand, if control signal NSLEEPin' is in a high voltage state (at or near TVDD), then PMOS transistor P4 shuts off and NMOS transistor N2 turns on. NMOS transistor N2 thus pulls the voltage at node O4 down at or near VSS so that control signal NSLEEPout is in the low voltage state at or near VSS. In this manner, control signal NSLEEPout indicates that header circuit 202 is turned off so that power is cut off to each of gated power circuits 205A and 205B.

Figure 2B:
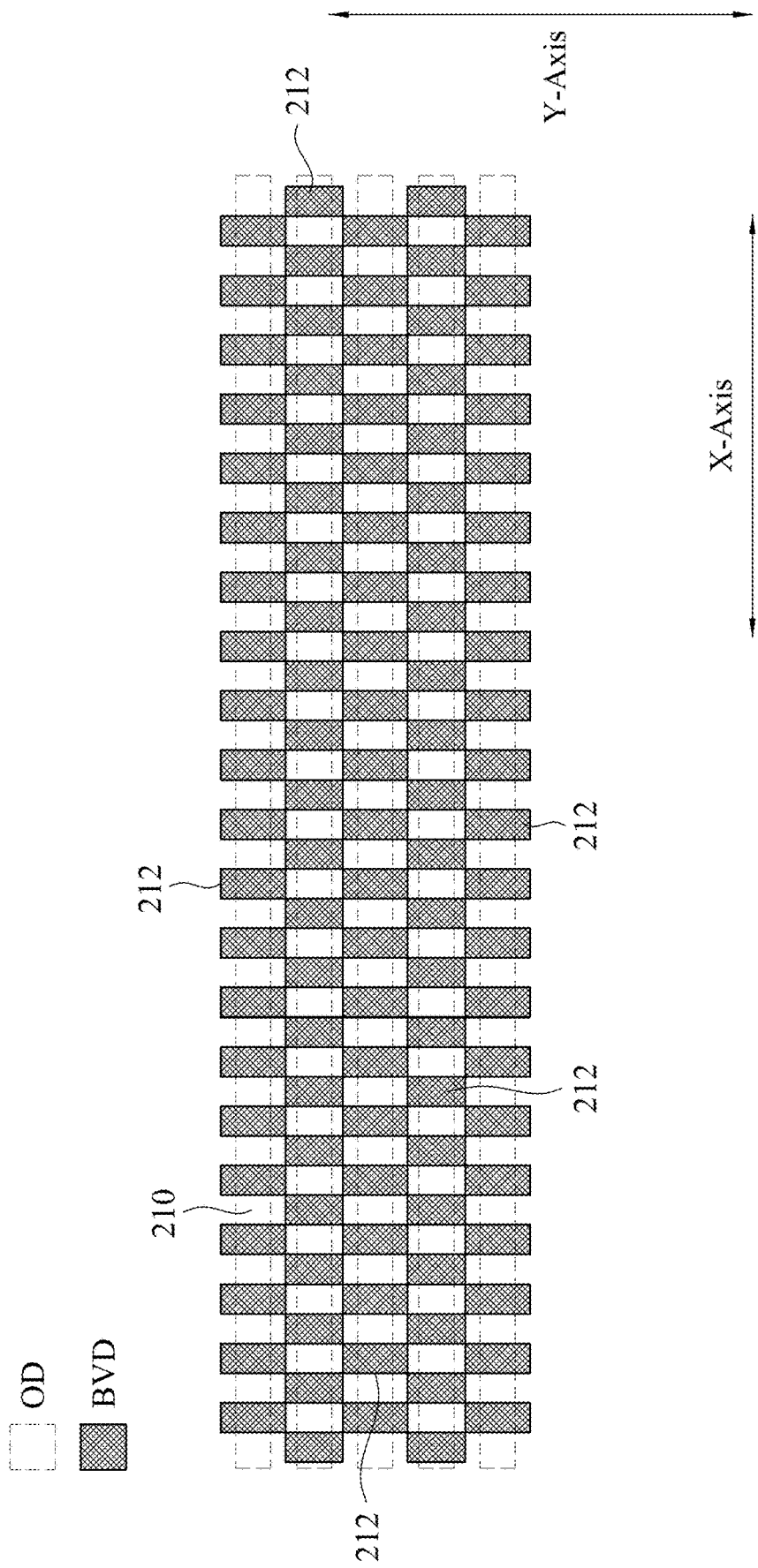
FIG. 2B is a layout diagram, in accordance with some embodiments.

FIG. 2B is a layout diagram, in accordance with some embodiments.

The layout diagram of FIG. 2B is representative of a semiconductor device. Structures in the semiconductor device are represented by patterns (also known as shapes) in the layout diagram. For simplicity of discussion, elements in the layout diagram of FIG. 2B (and of other figures included herein) will be referred to as if they are structures rather than patterns per se. For example, pattern 210 represents an active region (also known as an oxide-dimensioned (OD) region). In the following discussion, element 210 is referred to as active region 210 rather than a pattern 210.

FIG. 2B illustrates one example of a buried contact-to-transistor-component layer (layer BVD) that is provided beneath a semiconductor substrate (not shown in FIG. 2B). In some embodiments, buried layer BVD includes a plurality of buried conductive contacts 212 (not all labeled for the sake of clarity) wherein plurality of buried contacts are provided in rows and columns that are spaced apart in a checkered pattern. As explained in further detail below, buried layer BVD is provided below semiconductor substrate 213. In some embodiments, buried layer BVD is provided below semiconductor substrate 213.

Semiconductor substrate 213 includes active regions 210, each active region 210 has a first long axis that extends in a first direction, which in this case is parallel to X-axis. In this embodiment, members of active regions 210 are substantially parallel to one another in first direction and members of active regions 210 are separated and substantially aligned relative to a second direction, which is substantially orthogonal to first direction and parallel to Y-axis. The term "substantially" is intended to allow for a parameter, in this case "orthogonal," to be true within relevant semiconductor manufacturing error tolerances.

Long axes of buried conductive contacts 212 extend in direction of Y-axis. In FIG. 2B, buried conductive contacts 212 are arranged relative to track lines (not shown). The track lines extend in the direction of the Y-axis. Relative to the X-axis, buried conductive contacts 212 are aligned with corresponding ones of the tracks.

In this example, rows extend in the direction of the X-axis such that there are five rows of buried conductive contacts 212, one for each of active regions 210. Other embodiments may have a different number of rows of buried contacts, depending on the number of active regions 210. Rows may start with an empty slot followed by a buried conductive contact 212 and continue the pattern until the end of the row or may start with a buried conductive contact 212 followed by an empty slot until the end of the row. From top to bottom relative to the Y-axis, for odd numbered tracks, the first row, the third row, and the fifth row have empty slots, and the second and fourth rows have a buried conductive contact 212. From top to bottom relative to the Y-axis, for even numbered tracks, the first row, the third row, and the fifth row have a buried conductive contact 212, and the second and fourth rows have an empty slot. From top to bottom relative to the Y-axis, for even numbered tracks, the first active region 210 is connected to buried conductive contacts 212 in the first row of buried conductive contacts 212, third active region 210 is connected to buried conductive contacts 212 in the third row of buried conductive contacts 212, and fifth active region 210 is connected to buried conductive contacts 212 in the fifth row of buried conductive contacts 212. From top to bottom relative to the Y-axis, for odd numbered tracks, second active region 210 is connected to buried conductive contacts 212 in the second row of buried conductive contacts 212, and the fourth active region 210 is connected to buried conductive contacts 212 in the fourth row of buried conductive contacts 212. In this embodiment, there are forty-three tracks. In some embodiments, number of tracks is different than 43.

Buried conductive contacts 212 have a checkered arrangement which resembles a checkerboard pattern. In this embodiment, there are forty-three tracks.

Figure 2C:
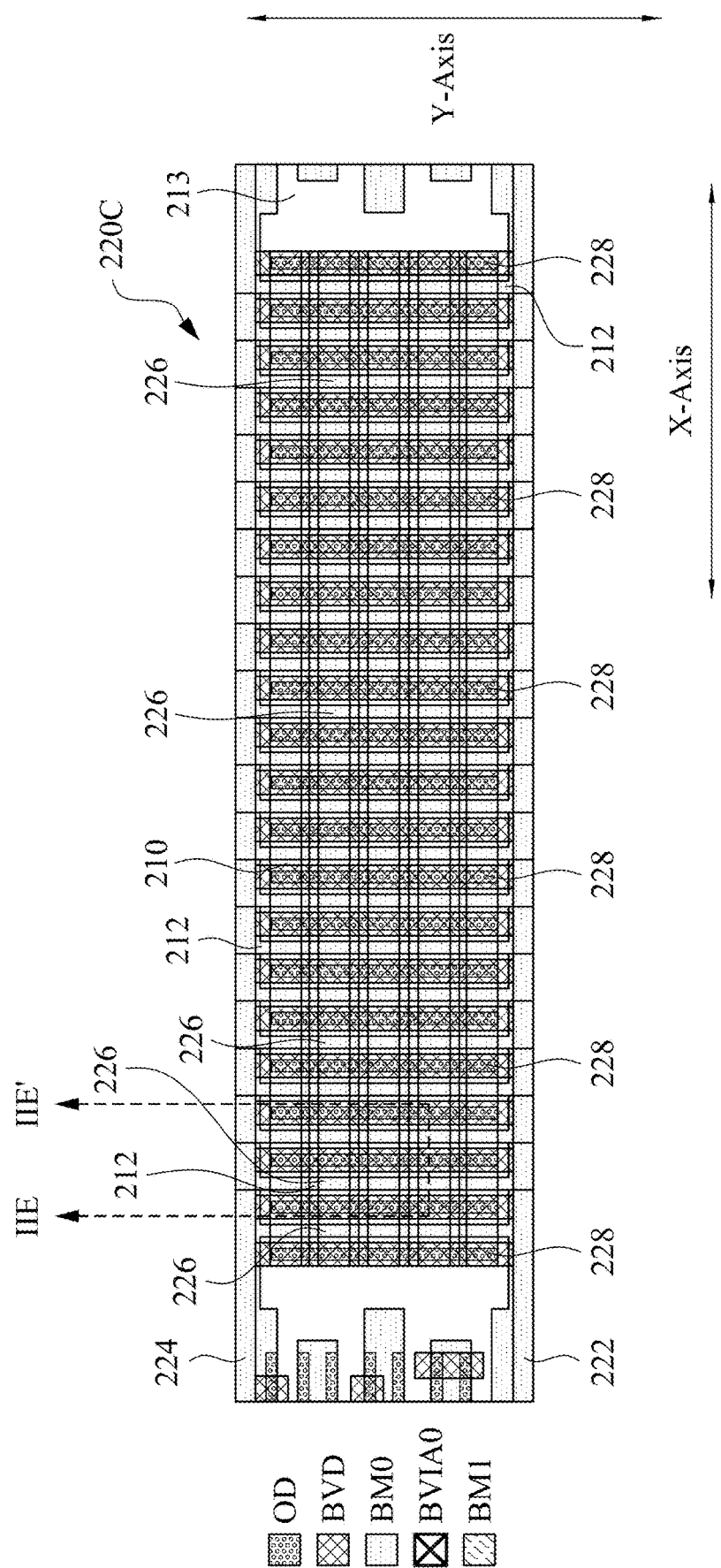
FIGS. 2C-2D are corresponding layout diagrams related to FIG. 2B, in accordance with some embodiments.
Figure 2D:
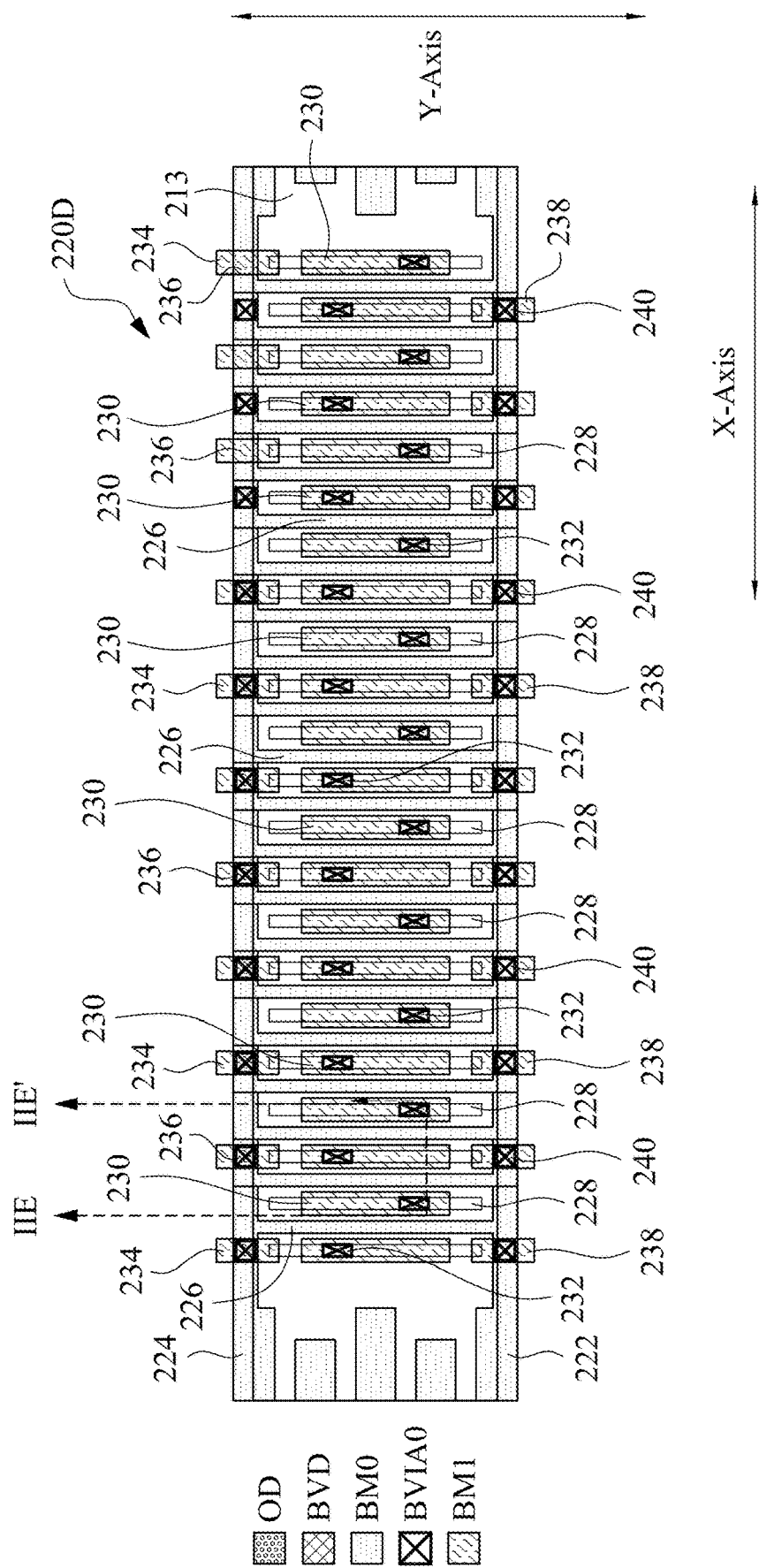

FIGS. 2C-2D are corresponding layout diagrams 220C and 220D, in accordance with some embodiments.

Together, layout diagrams 220C and 220D represent a header circuit, which is one example of header circuit 202 shown in FIG. 2A and an example of region 102 in FIG. 1. Active regions 210 in FIG. 2C are connected to checkered buried conductive contacts 212 below active regions 210 as described above with respect to FIG. 2B. In this example embodiment, there are five active regions 210. Other embodiments may include any suitable number of active regions. A first metal layer, in this case a buried BM0 layer, is provided below semiconductor substrate 213 and below buried layer BVD. Thus, layer BVD is provided between semiconductor substrate 213 and first buried metal layer BM0.

Layout diagrams 220C and 220D assume a corresponding semiconductor process technology node which includes various design rules for generating a layout diagram, and further assume that the design rules follow a numbering convention in which a first level of metallization (M_1st) and a corresponding first level of interconnect structures (V_1st) are referred to correspondingly as M0 and V0. In some embodiments, the numbering convention assumes that the M_1st level and the V_1st level are referred to correspondingly as M1 and V1.

First metal layer BM0 includes first buried conductive rail 222 and a second buried conductive rail 224. First buried conductive rail 222 has a long axis that extends in the first direction parallel to the X-axis and second buried conductive rail 224 has a long axis that extends in the first direction parallel to the X-axis. First metal layer BM0 also includes a first set of buried conductive fingers 226 (not all labeled for the sake of clarity) and a second set of buried conductive fingers 228 (not all labeled for the sake of clarity). In this embodiment, there are 21 instances of buried conductive fingers 226 and 22 instances of buried conductive fingers 228. Other embodiments may have any suitable number of buried conductive fingers 226 and buried conductive fingers 228. Each buried conductive finger 226 and each buried conductive finger 228 has a long axis extending in the direction of the Y-axis and a short axis extending in the direction of the X-axis. In some embodiments, the buried conductive fingers 226 are configured to receive the gated reference voltage VVDD and the buried conductive fingers 228 are configured to receive the ungated reference voltage TVDD.

Each of buried conductive fingers 226 extends from first buried conductive rail 222 and from second buried conductive rail 224 so as to extend between first buried conductive rail 222 and second buried conductive rail 224. In this embodiment, each of buried conductive contacts 212 (see also FIG. 2B) in a given column amongst the even-numbered columns of buried conductive contacts 212 is connected to a corresponding one of buried conductive fingers 226 which is aligned with the given column. Furthermore, each of buried conductive fingers 226 in the first set of buried conductive fingers 226 extends beneath all of active regions 210. As explained below, buried conductive fingers 226 in the first set of buried conductive fingers 226 may be connected to provide gated reference voltage VVDD.

Though each of buried conductive fingers 228 in the second set of buried conductive fingers 228 has a long axis that extends in the direction of the Y-axis, nevertheless each of buried conductive fingers 228 is not connected to first buried conductive rail 222 nor to second buried conductive rail 224. In this embodiment, each of buried conductive contacts 212 (see also FIG. 2B) in a given column amongst the odd-numbered columns of buried conductive contacts 212 is connected to a corresponding one of buried conductive fingers 228 which is aligned with the given column. Furthermore, each of buried conductive fingers 228 in the second set of buried conductive fingers 228 extends beneath all of active regions 210. As explained below, buried conductive fingers 228 in the second set of buried conductive fingers 228 may be connected to provide gated reference voltage TVDD.

Furthermore, the second set of buried conductive fingers 228 is interleaved with the first set of buried conductive fingers 226. Relative to the X-axis, the left most conductive finger is one of buried conductive fingers 228 and the right most conductive fingers is one of buried conductive fingers 228. The left most conductive finger 228 has an adjacent one of buried conductive fingers 226 immediately to its right. Right most conductive finger 228 has an immediately adjacent one of buried conductive fingers 226 to its left. Other than left most buried conductive finger 228 and right most buried conductive fingers 228 at the ends, each one of buried conductive fingers 228 is between a pair of buried conductive fingers 226. Each one of buried conductive fingers 226 is between a pair of buried conductive fingers 228. This particular arrangement is the result of there being one more instance of buried conductive finger 228 than there are instances of buried conductive finger 226. In other embodiments, there may be more instances of buried conductive finger 226 than there are instances of buried conductive finger 228. As a result, there would be buried conductive fingers 226 at the left most and right most ends instead of buried conductive fingers 228. If there were an equal number of buried conductive fingers 226 and buried conductive fingers 228, one of buried conductive fingers 226 would be at one end (either left most or right most end) and one of buried conductive fingers 228 would be at the other end (either right most or left most end).

Again, FIG. 2D is a layout diagram 220D, in accordance with some embodiments.

FIG. 2D illustrates additional features of header circuit 220 described above with respect to FIG. 2C. In particular, FIG. 2D illustrates additional features of buried via layer BVIA0 and another buried metal layer BM1. Buried via layer BVIA0 is below first metal layer BM0 and between first buried metal layer BM0 and second buried metal layer BM1. Second buried metal layer BM1 is beneath buried via layer BVIA0 and thus beneath first buried metal layer BM0.

Second buried metal layer BM1 includes a third set of buried conductive fingers 230 (not all labeled for the sake of clarity). Each buried conductive finger 230 in the third set of buried conductive fingers 230 is provided beneath a different one of the second set of buried conductive fingers 228 in first buried metal layer BM0. Layout diagram 220D further includes a set of buried vias 232 that are in a first buried interconnection layer BVIA0 and that connect buried conductive fingers 230 in the third set of buried conductive fingers 230 to buried conductive fingers 228 in second set of buried conductive fingers 228. Buried vias 232 that connect buried conductive fingers 230 in third set of buried conductive fingers 230 to buried conductive fingers 228 in second set of buried conductive fingers 228 are rectangular and have a width (parallel to the X-axis) that is substantially equal to a width (parallel to the X-axis) of buried conductive fingers 228. Buried conductive fingers 230 in third set of buried conductive fingers 230 have a width (relative to the X-axis) that is larger than the width of buried conductive fingers 228 in second set of buried conductive fingers 228. Furthermore, each of buried conductive fingers 230 is centered beneath a corresponding one of buried conductive fingers 228. This increases, if not maximizes, the contact area that connects buried conductive fingers 230 in third set of buried conductive fingers 230 to buried conductive fingers 228 in second set of buried conductive fingers 228.

Furthermore, every other one of buried vias 232 is aligned with a corresponding buried conductive contact 212 in the second row of corresponding column of buried conductive contacts 212 that buried conductive finger 228 is connected to. More specifically, each of the odd numbered conductive fingers is connected to a buried via 232 that is aligned with a buried conductive contact 212 that is in the second row of buried conductive contacts 212 (See FIG. 2B to see the second row of buried conductive contacts 212). Every other one of buried vias 232 is aligned with a corresponding buried conductive contact 212 in the fourth row of the corresponding column of buried conductive contacts 212 that buried conductive finger 228 is connected to. More specifically, of the buried conductive fingers 228, each of the even numbered conductive fingers is connected to a buried via 232 that is aligned with a buried conductive contact 212 that is in the fourth row of buried conductive contacts 212 (See FIG. 2B to see the fourth row of buried conductive contacts 212). Each of buried conductive fingers 230 is configured to receive TVDD. The arrangement of FIGS. 2C-2D described above increases the amount of surface area that provides connections to buried conductive contacts 212 and buried vias 232 through buried conductive fingers 228. This reduces the resistance of the header circuit represented by layout diagrams 220C and 220D, and thus reduces the power consumption of the header circuit represented by layout diagrams 220C and 220D.

The buried metal layer BM1 also includes a first set of conductors 234 (not all labeled for the sake of clarity). First set of conductors 234 each have a long axis that extends in the second direction parallel to the Y-axis. Each of conductors 234 is provided beneath first buried conductive rail 222. Buried via layer BVIA0 also includes a set of vias 236 (not all labeled for the sake of clarity) that connects conductors 234 to first buried conductive rail 222. Conductors 234 are configured to receive gated reference voltage VVDD and thus first buried conductive rail 222 is provided at VVDD.

Buried metal layer BM1 also includes a second set of conductors 238 (not all labeled for the sake of clarity). Second set of conductors 238 each have a long axis that extends in the second direction parallel to the Y-axis. Each of conductors 238 is provided beneath second buried conductive rail 224. Buried via layer BVIA0 also includes a set of vias 240 (not all labeled for the sake of clarity) that connects conductors 238 to second buried conductive rail 224. Conductors 238 are configured to receive gated reference voltage VVDD and thus second buried conductive rail 224 is provided at VVDD. Note that first set of buried conductive fingers 226, second set of buried conductive fingers 228, and third set of buried conductive fingers 230 are all provided relative to second direction parallel to the Y-axis between first buried conductive rail 222 and second buried conductive rail 224. In some embodiments, the arrangement of FIGS. 2C-2D increases the effective area for connecting to TVDD by 250% and the effective area for connecting to VVDD by 160% thereby significantly decreasing the resistive load in the header circuit represented by layout diagrams 220C and 220D.

Figure 2E:
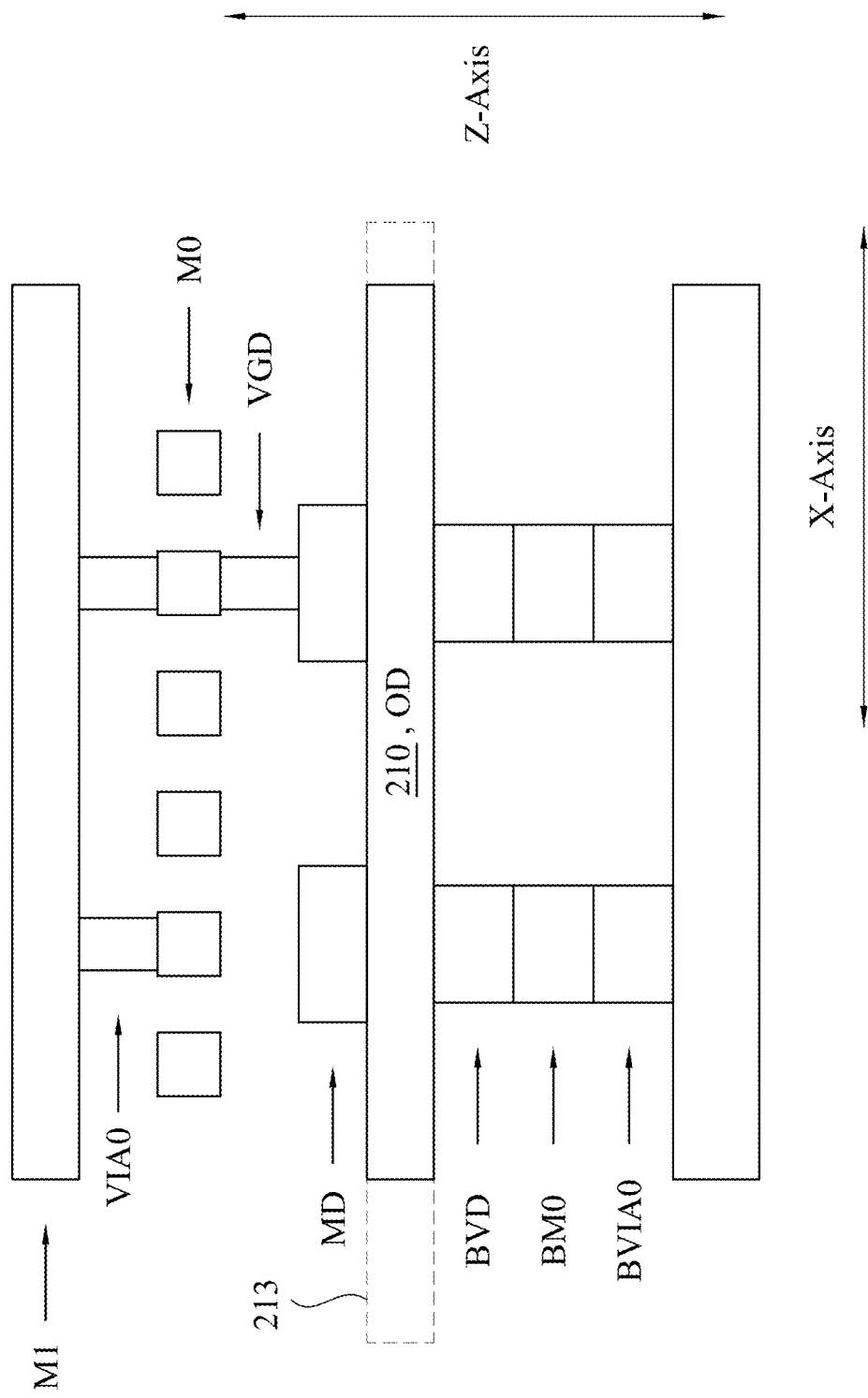
FIG. 2E is a cross-section related to FIGS. 2C-2D, in accordance with some embodiments.

FIG. 2E is a cross-section, in accordance with some embodiments.

More particularly, FIG. 2E illustrates a cross sectional area of a header circuit corresponding to cross-section indicator IIE-IIE' shown in each of layout diagrams 220C and 220D of corresponding FIGS. 2C and 2D.

The cross-section of FIG. 2E includes the semiconductor substrate 213, contact-to-transistor-component layer (layer BVD), buried metal layer BM0, buried via layer BVIA0, and buried metal layer BM1. Also shown are a metal-to-drain/source layer (MD layer), a via-to-gate/MD layer (VGD layer), a metal layer M0, via layer VIA0, and a metal layer M1. In some embodiments, the VGD layer is referred to as a via-to-MD layer (VD layer). From top to bottom relative to a Z-axis, metal layer M1, via layer VIA0, metal layer M0, VGD layer, MD layer, semiconductor substrate 213, layer BVD, buried metal layer BM0, buried via layer BVIA0, and buried metal layer BM1 form a stack of layers. The Z-axis is substantially orthogonal to both the X-axis (see FIGS. 2C and 2D) and the Y-axis. As shown in FIG. 2E, metal layer M1, via layer VIA0, metal layer M0, VGD layer and MD layer are stacked over semiconductor substrate 213. Active (OD) regions 210 are provided by semiconductor substrate 213. Metal layer M1, via layer VIA0, metal layer M0, VGD layer, and MD layer are used to form the contacts of transistors in the IC and for typical routing in an IC. Layer BVD, buried metal layer BM0, buried via layer BVIA0, and buried metal layer BM1 are stacked beneath semiconductor substrate 213 in that order from top to bottom. Since layer BVD, buried metal layer BM0, buried via layer BVIA0, and buried metal layer BM1 are stacked beneath semiconductor substrate 213, they are referred to as "buried" layers. Utilizing the arrangement described above and below, the layer BVD, buried metal layer BM0, buried via layer BVIA0, and buried metal layer BM1 are utilized to distribute VVDD and TVDD in a header circuit, such as header circuit 220.

Figure 3:
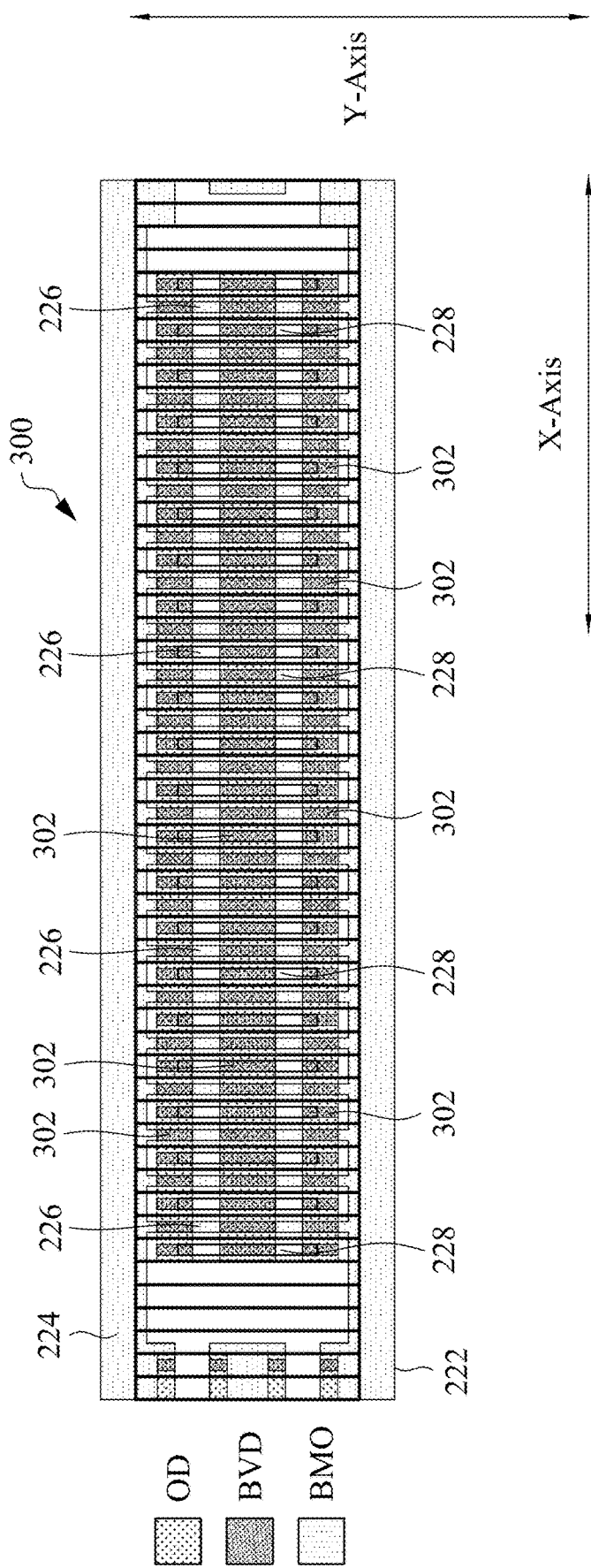
FIG. 3 is a layout diagram, in accordance with some embodiments.

FIG. 3 is a layout diagram 300, in accordance with some embodiments.

FIG. 3 represents another example of a header circuit, which is one example of header circuit 202 shown in FIG. 2A and an example of region 102 in FIG. 1. Layout diagram 300 is similar to layout diagram 220C and 220D shown in corresponding FIGS. 2C and 2D. Accordingly, the discussion will concentrate on the differences between layout diagram 300 and layout diagrams 220C-220D for the sake of brevity.

In FIG. 3, layout diagram 300 includes a set of three active regions 210 instead of five active regions 210 as in layout diagrams 220C-220D. Furthermore, in this embodiment, top most active region 210 and bottom most active region 210 are substantially equal in width (relative to the Y-axis) while intermediate active region 210 is wider than top most active region 210 and bottom most active region 210. In this embodiment, intermediate active region 210 is approximately twice as wide as top most active region 210 and bottom most active region 210. Other implementations may have other suitable ratios between active regions 210. Furthermore, in other embodiments, all of active regions 210 may be provided in different sizes.

Layout diagram 300 has first buried metal layer BM0 arranged in the same manner described above with respect to FIG. 2C and FIG. 2D. Thus, first set of buried conductive fingers 226 (not all labeled for the sake of clarity), second set of buried conductive fingers 228 (not all labeled for the sake of clarity), first buried conductive rail 222, and second buried conductive rail 224 are provided in the same manner described above with respect to FIG. 2C and FIG. 2D. However, in FIG. 3, layer BVD has a different arrangement than the arrangement shown in FIG. 2B. Rather than being checkered, three rows of buried conductive contacts 302 (not all labeled for the sake of clarity) are provided in layer BVD.

From top to bottom relative to the Y-axis, first row of buried conductive contacts 302 are connected to first active region 210, second row of buried conductive contacts 302 is connected to second active region 210, and third row of buried conductive contacts 302 is connected to third active region 210. While there is spacing between buried conductive contacts 302 in each row, there are no empty slots within the rows. Thus, first layer BVD does not have a checkered pattern.

Relative to the Y-axis, a size of each of buried conductive contacts 302 is substantially equal to the size of active region 210 to which it is connected. Thus, relative to the Y-axis, buried conductive contacts 302 in the second row of buried conductive contacts 302 have a size that is substantially twice as long as a size of buried conductive contacts 302 in the first row of buried conductive contacts 302. Additionally, relative to the Y-axis, buried conductive contacts 302 in the second row of buried conductive contacts 302 have a size that is substantially twice as long as the size of buried conductive contacts 302 in the third row of buried conductive contacts 302. Relative to the Y-axis, the size of buried conductive contacts 302 in the first row of buried conductive contacts 302 and the size of buried conductive contacts 302 in the third row of buried conductive contacts 302 is substantially equal.

With respect to the columns of buried conductive contact 302, each of the columns has a buried conductive contact 302, an empty slot, a buried conductive contact 302, an empty slot, and then a buried conductive contact 302. Relative to the Y-axis, second buried conductive contact 302 in each of the columns has a size twice as long as the size of first buried conductive contact 302 and third buried conductive contact 302 in each of the columns. There are a total of 43 columns of buried conductive contacts 302 in this embodiment. From left to right relative to the X-axis, every even numbered column of buried conductive contacts 302 is connected to a different one of buried conductive fingers 226 in the first set of buried conductive fingers 226 while every odd numbered column of the buried conductive contacts 302 is connected to a different one of buried conductive fingers 228. The even numbered columns of buried conductive contacts 302 and buried conductive fingers 226 are provided at VVDD while the odd numbered columns of buried conductive contacts 302 and buried conductive fingers 228 are provided at TVDD.

In FIG. 3, relative to the X-axis, a width of buried conductive contacts 302 is substantially equal to a width of buried conductive finger 226 or buried conductive finger 228 to which it is attached. Also, in this embodiment, buried conductive fingers 226 and buried conductive fingers 228 all have widths that are substantially equal. Thus, buried conductive contacts 302 have substantially equal widths. In other embodiments, buried conductive fingers 226 and buried conductive fingers 228 have different widths. In still other embodiments, different subsets of buried conductive fingers 226 may have different widths and different subsets of buried conductive fingers 228 have different widths. Accordingly, different subsets of buried conductive contacts 302 may have different widths depending on the configuration of active regions 210 and buried conductive fingers 226, 228 to which it is connected.

Figure 4A:
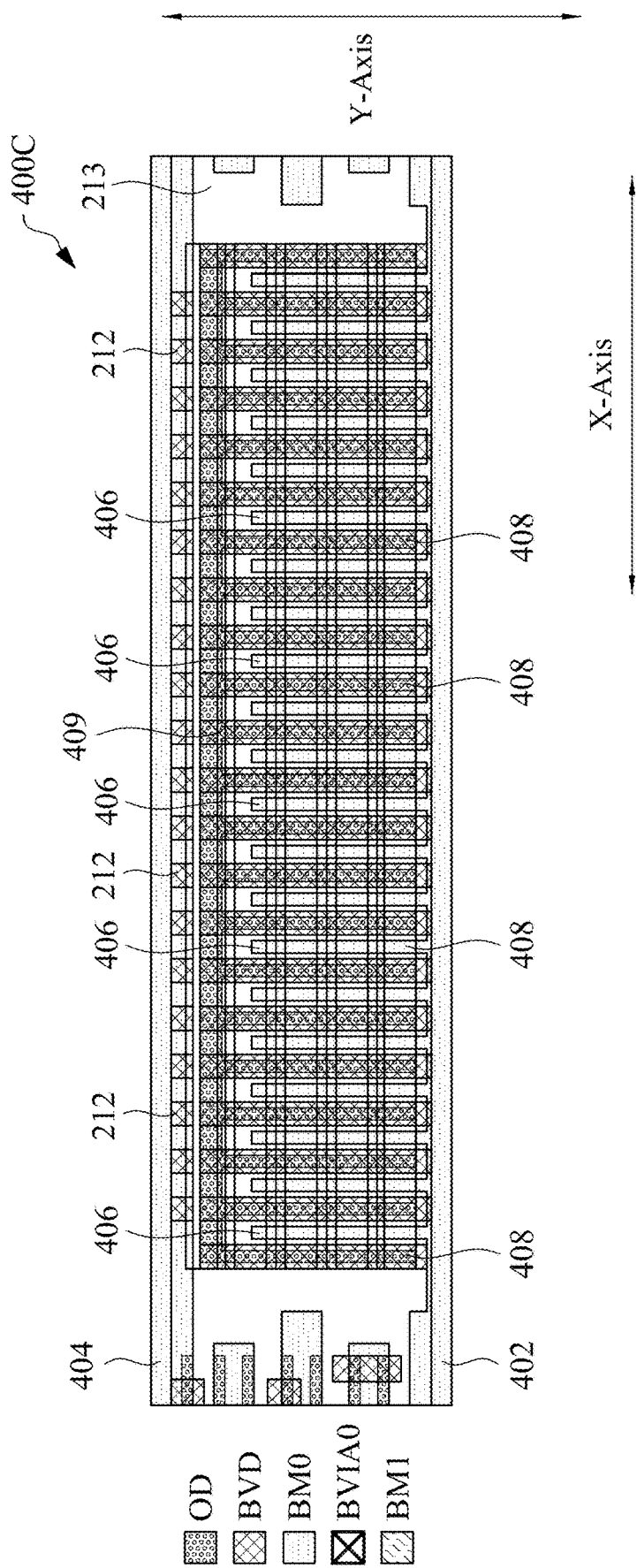
FIGS. 4A-4B are corresponding layout diagrams, in accordance with some embodiments.
Figure 4B:
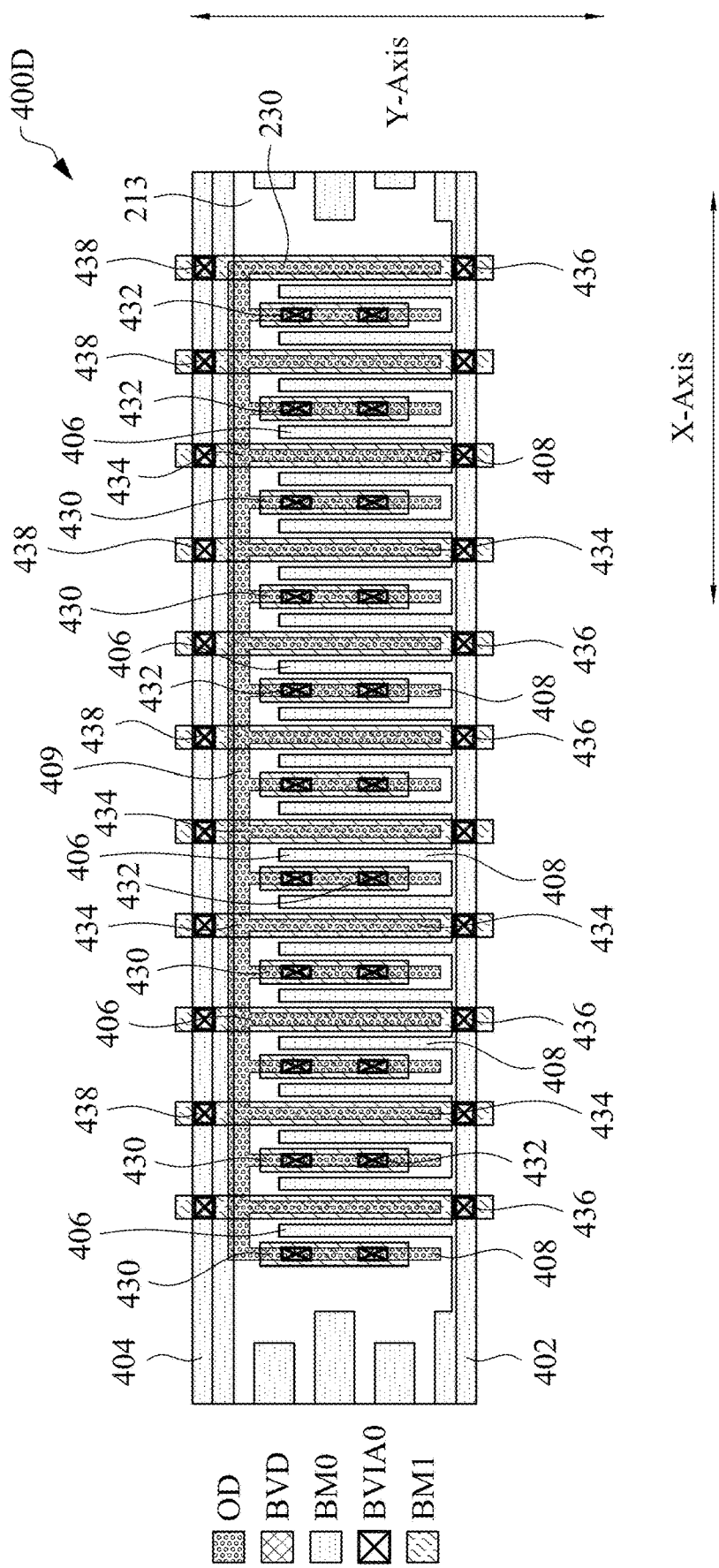

FIGS. 4A-4B are corresponding layout diagrams 400C and 400D, in accordance with some embodiments.

Together, layout diagrams 400C and 400D represent a header circuit, which is one example of header circuit 202 shown in FIG. 2A and an example of region 102 in FIG. 1. Semiconductor substrate 213 includes a set of active regions 210, each active region 210 in active regions 210 has a first long axis that extends in a first direction, which in this case is parallel to the X-axis. In this embodiment, members of active regions 210 are substantially parallel to one another in the first direction and the members of active regions 210 are separated and substantially aligned relative to a second direction, which is substantially orthogonal to the first direction and parallel to the Y-axis. Active regions 210 are arranged in semiconductor substrate 213 in the same manner described above with respect to FIG. 2C.

FIG. 4A illustrates features of header circuit.

Active regions 210 in FIG. 4A are connected to checkered buried conductive contacts 212 below active regions 210 as described above with respect to FIG. 2B. The first buried metal layer, in this case a buried BM0 layer, is provided below semiconductor substrate 213 and below layer BVD. Thus, layer BVD is provided between semiconductor substrate 213 and first buried metal layer BM0. First metal layer BM0 includes first buried conductive rail 402 and a second buried conductive rail 404. First buried conductive rail 402 has a long axis that extends in the first direction parallel to the X-axis and second buried conductive rail 404 has a long axis that extends in the first direction parallel to the X-axis. First metal layer BM0 also includes a first set of buried conductive fingers 406 (not all labeled for the sake of clarity) and a second set of buried conductive fingers 408 (not all labeled for the sake of clarity). In this embodiment, there are 21 of the buried conductive fingers 406 and 22 of the buried conductive fingers 408. Other embodiments may have any suitable number of buried conductive fingers 406 and buried conductive fingers 408. Additionally, the first buried metal layer includes a conductive trace 409 having a long axis that extends in the first direction.

Each of buried conductive fingers 406 in the first set of buried conductive fingers 406 has a long axis that extends in the second direction that is parallel to the Y-axis (substantially orthogonal to the first direction and the Y-axis). Each of buried conductive fingers 406 also extend from first buried conductive rail 402 but is unconnected to second buried conductive rail 404. Furthermore, each of buried conductive fingers 408 in the second set of buried conductive fingers 408 has a long axis that extends in the second direction that is parallel to the Y-axis (substantially orthogonal to the first direction and the Y-axis). Each of buried conductive fingers 408 also extend from buried conductive trace 409 but is unconnected to first buried conductive rail 402 second buried conductive rail 404.

In this embodiment, each of buried conductive fingers 406 is connected to each of buried conductive contacts 212 (shown in FIG. 2B) in the even columns of buried conductive contacts 212 in layer BVD. Furthermore, each of buried conductive fingers 406 in the first set of buried conductive fingers 406 extends beneath the bottom four active regions 210 relative to the X-axis. As explained below, buried conductive fingers 406 in the first set of buried conductive fingers 406 may be connected to provide gated reference voltage VVDD.

Each of buried conductive fingers 408 in the second set of buried conductive fingers 408 has a long axis that extends in a second direction that is parallel to the Y-axis (substantially orthogonal to the first direction and the Y-axis). However, each of buried conductive fingers 408 also are not connected to first buried conductive rail 402 and second buried conductive rail 404. Instead, buried conductive fingers 408 extend in the second direction from conductive trace 409. In this embodiment, each of buried conductive fingers 408 is connected to each of buried conductive contacts 212 (shown in FIG. 2B) in the odd columns of buried conductive contacts 212 in the layer BVD. Furthermore, each of buried conductive fingers 408 in the second set of buried conductive fingers 408 extends beneath the bottom four of the active regions 210. As explained below, buried conductive fingers 408 in the second set of buried conductive fingers 408 may be connected to provide gated reference voltage TVDD.

Furthermore, the second set of buried conductive fingers 408 is interleaved with the first set of buried conductive fingers 406. Relative to the X-axis, the left most conductive finger is one of buried conductive fingers 408 and the right most conductive fingers is one of buried conductive fingers 408. The left most conductive finger 408 has an adjacent one of buried conductive fingers 406 immediately to its right. The right most conductive finger 408 has an adjacent one of buried conductive fingers 406 immediately to its left. Other than the left most buried conductive finger 408 and the right most buried conductive fingers 408 at the ends, every other buried conductive finger 408 is between a pair of buried conductive fingers 406. Each of buried conductive fingers 406 is between a pair of buried conductive fingers 408. This particular arrangement is the result of there being one more buried conductive finger 408 than buried conductive fingers 406. In other embodiments, there may be one more buried conductive finger 406 than buried conductive finger 408. As a result, there would be buried conductive fingers 406 at the left most and right most ends instead of buried conductive fingers 408. If there were an equal number of buried conductive fingers 406 and buried conductive fingers 408, one of buried conductive fingers 406 would be at one end (either left most or right most end) and one of buried conductive fingers 408 would be at the other end (either right most or left most end). Since buried conductive fingers 408 extend from conductive trace 409 and buried conductive fingers 406 extend from first buried conductive rail 402, the interleaving of buried conductive fingers 406 and buried conductive fingers 408 provide a combed structure.

Buried conductive fingers 406, buried conductive fingers 408, and conductive trace 409 are provided between first buried conductive rail 402 and second buried conductive rail 404 relative to the second direction, which is parallel to the Y-axis. Conductive trace 409 is connected to the first row of buried conductive contacts 212 in layer BVD. Conductive trace 409 is provided at gated reference voltage TVDD.

FIG. 4B illustrates additional features of header circuit described above with respect to FIG. 4A.

In particular, FIG. 4B illustrates additional features of buried via layer BVIA0 and another buried metal layer BM1. Buried via layer BVIA0 is below first metal layer BM0 and between first buried metal layer BM0 and second buried metal layer BM1. Second buried metal layer BM1 is beneath buried via layer BVIA0 and thus beneath first buried metal layer BM0.

Second buried metal layer BM1 includes a third set of buried conductive fingers 430 (not all labeled for the sake of clarity). From left to right relative to the X-axis, each buried conductive finger 430 in the third set of buried conductive fingers 430 is provided beneath every odd numbered one of the second set of buried conductive fingers 408 in first buried metal layer BM0. Second buried via layer BVIA0 includes a set of buried vias 432 that connect buried conductive fingers 430 in the third set of buried conductive fingers 430 to buried conductive fingers 408 in the second set of buried conductive fingers 408. Buried vias 432 that connect buried conductive fingers 430 in the third set of buried conductive fingers 430 to buried conductive fingers 408 in the second set of buried conductive fingers 408 are rectangular and have a width (parallel to the X-axis) that is substantially equal to a width (parallel to the X-axis) of buried conductive fingers 408. Buried conductive fingers 430 in the third set of buried conductive fingers 430 have a width (relative to the X-axis) that is larger than the width of buried conductive fingers 408 in the second set of buried conductive fingers 408. Furthermore, each of buried conductive fingers 430 is centered beneath a corresponding one of buried conductive fingers 408. This maximizes the contact area that connects buried conductive fingers 430 in the third set of buried conductive fingers 430 to buried conductive fingers 408 in the second set of buried conductive fingers 408. There are two of buried vias 432 that are provided on every odd numbered buried conductive finger 430. One of two buried vias 432 is aligned below second active region 210 and the other one of two buried vias 432 is aligned below fourth active region 210.

Second buried metal layer BM1 includes a fourth set of buried conductive fingers 434 (not all labeled for the sake of clarity). From left to right relative to the X-axis, each buried conductive finger 434 in the fourth set of buried conductive fingers 434 is provided beneath every even numbered one of the first set of buried conductive fingers 406 in first buried metal layer BM0. Each buried conductive finger 434 in the fourth set of buried conductive fingers 434 also extends from first buried conductive rail 402 to second buried conductive rail 404. Second buried via layer BVIA0 includes a set of vias 436 that connect buried conductive fingers 434 in the fourth set of buried conductive fingers 434 to first buried conductive rail 402. Second buried via layer BVIA0 includes another set of vias 438 that connect buried conductive fingers 434 in the fourth set of buried conductive fingers 434 to second buried conductive rail 404. First buried conductive rail 402 and second buried conductive rail 404 are connected to provide gated reference voltage VVDD. In some embodiments, the arrangement increases the effective area for connecting to TVDD by 160% and the effective area for connecting to VVDD by 148% thereby significantly decreasing the resistive load in the header circuit 400.

Figure 5:
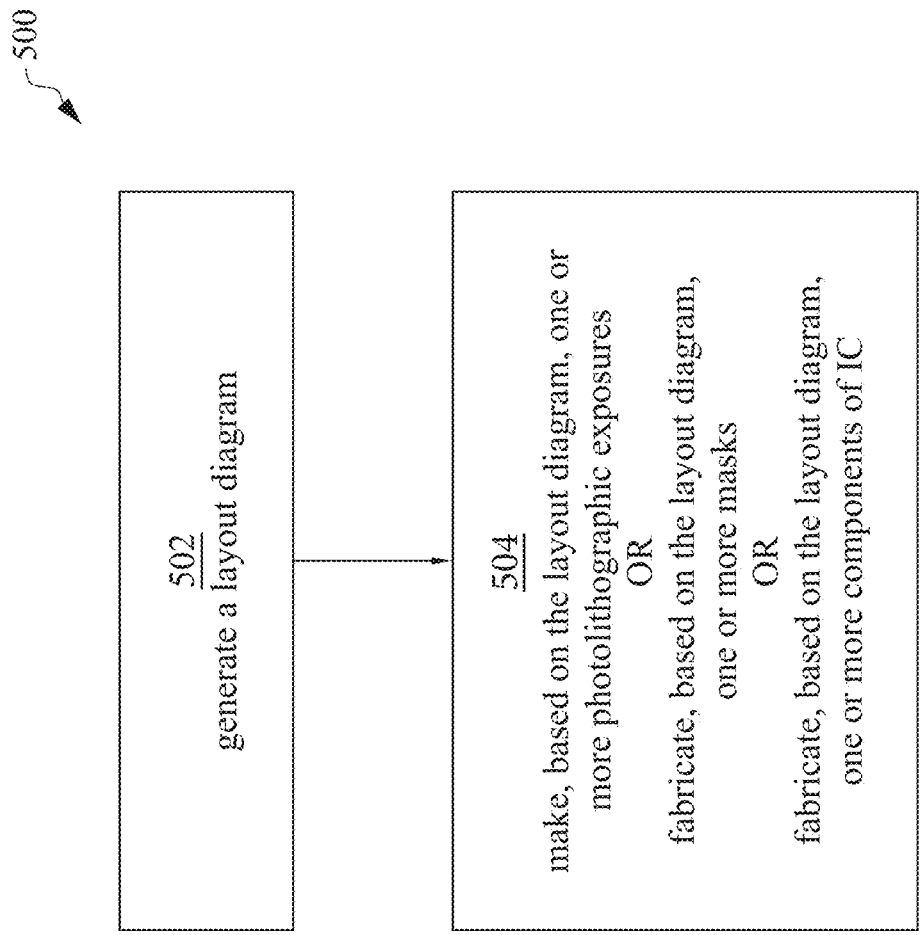
FIG. 5 is a flowchart of a method, in accordance with some embodiments.

FIG. 5 is a flowchart of a method 500 of generating a layout diagram, in accordance with some embodiments.

Method 500 is implementable, for example, using EDA system 700 (FIG. 7, discussed below) and an integrated circuit (IC) manufacturing system 800 (FIG. 8, discussed below), in accordance with some embodiments. Regarding method 500, examples of the layout diagram include the layout diagrams disclosed herein, or the like. Examples of a semiconductor device which can be manufactured according to method 500 include semiconductor device 100 FIG. 1.

In FIG. 5, method 500 includes blocks 502-504. At block 502, a layout diagram is generated which, among other things, includes patterns representing one or more BCL CFETs as disclosed herein, or the like. An example of a semiconductor device corresponding to a layout diagram generated by block 502 includes semiconductor device 100 of FIG. 1. Block 502 is discussed in more detail below with respect to FIG. 6. From block 502, flow proceeds to block 504.

At block 504, based on the layout diagram, at least one of (A) one or more photolithographic exposures are made or (B) one or more semiconductor masks are fabricated or (C) one or more components in a layer of a semiconductor device are fabricated. See discussion below of FIG. 7.

Figure 6:
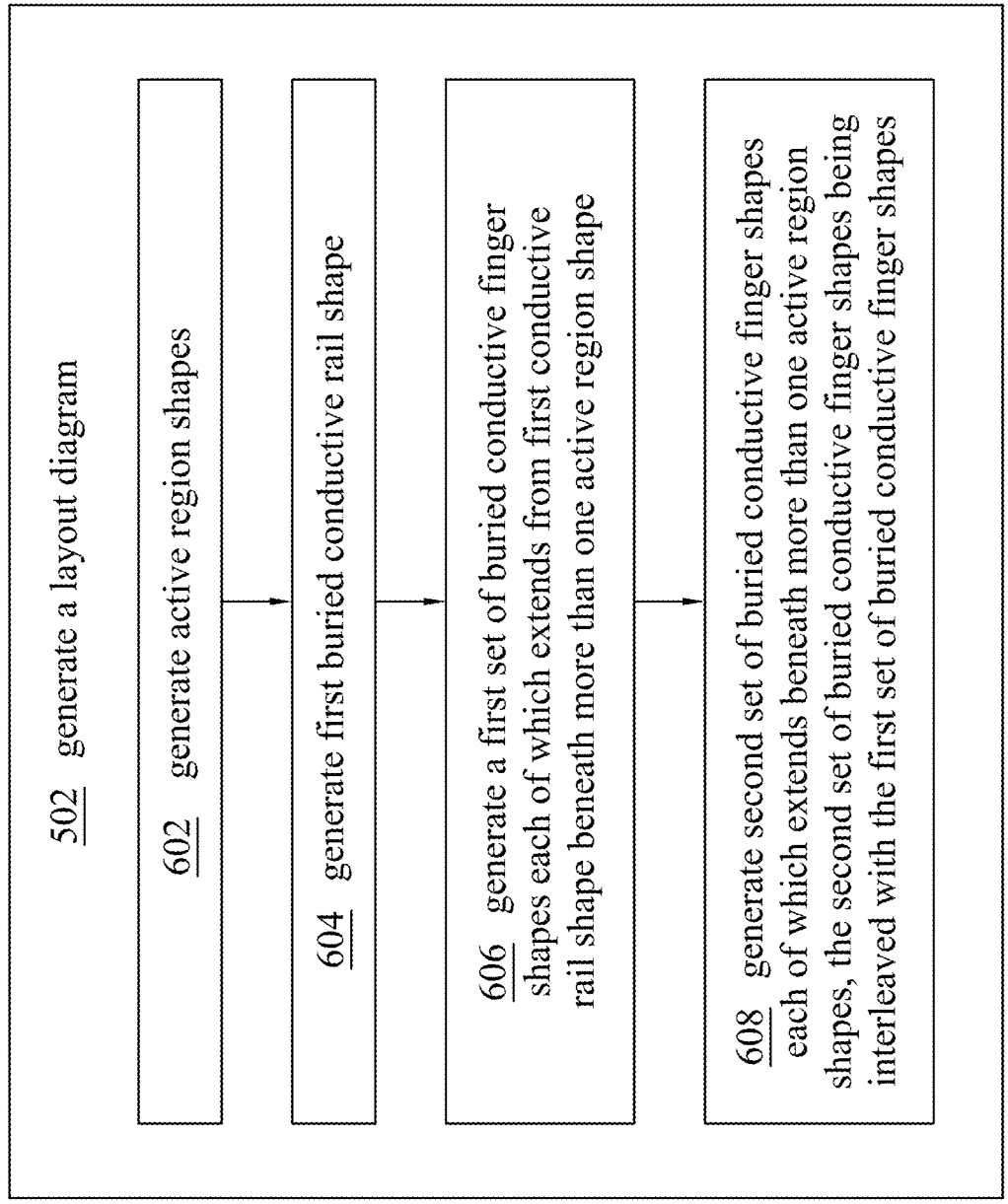
FIG. 6 is a flowchart of a method, in accordance with some embodiments.

FIG. 6 is a flowchart of a method of generating a layout diagram, in accordance with some embodiments.

More particularly, the flowchart of FIG. 6 shows one example of procedures that may be implemented in block 502 of FIG. 5, in accordance with one or more embodiments.

In FIG. 6, block 502 includes blocks 602-608. At block 602, active region shapes are generated, wherein each active region shape of the active region shapes has a first long axis that extends in a first direction on a semiconductor substrate shape. An example of the first direction is the X-axis. Examples of the active region shapes would be active region shapes that correspond to the active regions 210 in FIGS. 2C, 2D, 4A, 4B in a layout diagram. From block 602, flow proceeds to block 604.

At block 604, a first buried conductive rail shape is generated that has a second long axis that extends in the first direction. Examples of the first conductive rail shapes are shapes that correspond with the first buried conductive rail 222 in FIGS. 2C, 2D, 3 and first buried conductive rail 402 in FIGS. 4A, 4B in a layout diagram. From block 604, flow proceeds to block 606.

At block 606, a first set of buried conductive finger shapes is generated that extends from the first conductive rail shape. Each buried conductive finger shape in the first set of buried conductive finger shapes has a third long axis that extends in a second direction, the second direction being substantially orthogonal to the first direction. Also, the first set of buried conductive finger shapes extends beneath more than one of the sets of active region shapes. An example of the second direction is the Y-axis. Furthermore, examples of the first set of buried conductive fingers shapes are shapes that correspond to the first set of buried conductive fingers 226 in FIGS. 2C, 2D, 3 and the first set of buried conductive fingers 406 in FIG. 4A, 4B in a layout diagram.

At block 608, a second set of buried conductive finger shapes is generated. Each buried conductive finger shape in the second set of buried conductive finger shapes has a fourth long axis that extends in the second direction. Also, the second set of buried conductive finger shapes extends beneath more than one of the sets of active region shapes and the second set of buried conductive finger shapes are interleaved with the first set of buried conductive finger shapes. Examples of the second set of buried conductive fingers shapes are shapes that correspond to the second set of buried conductive fingers 228 in FIGS. 2C, 2D, 3 and the second set of buried conductive fingers 406 in FIG. 4A, 4B in a layout diagram.

Figure 7:
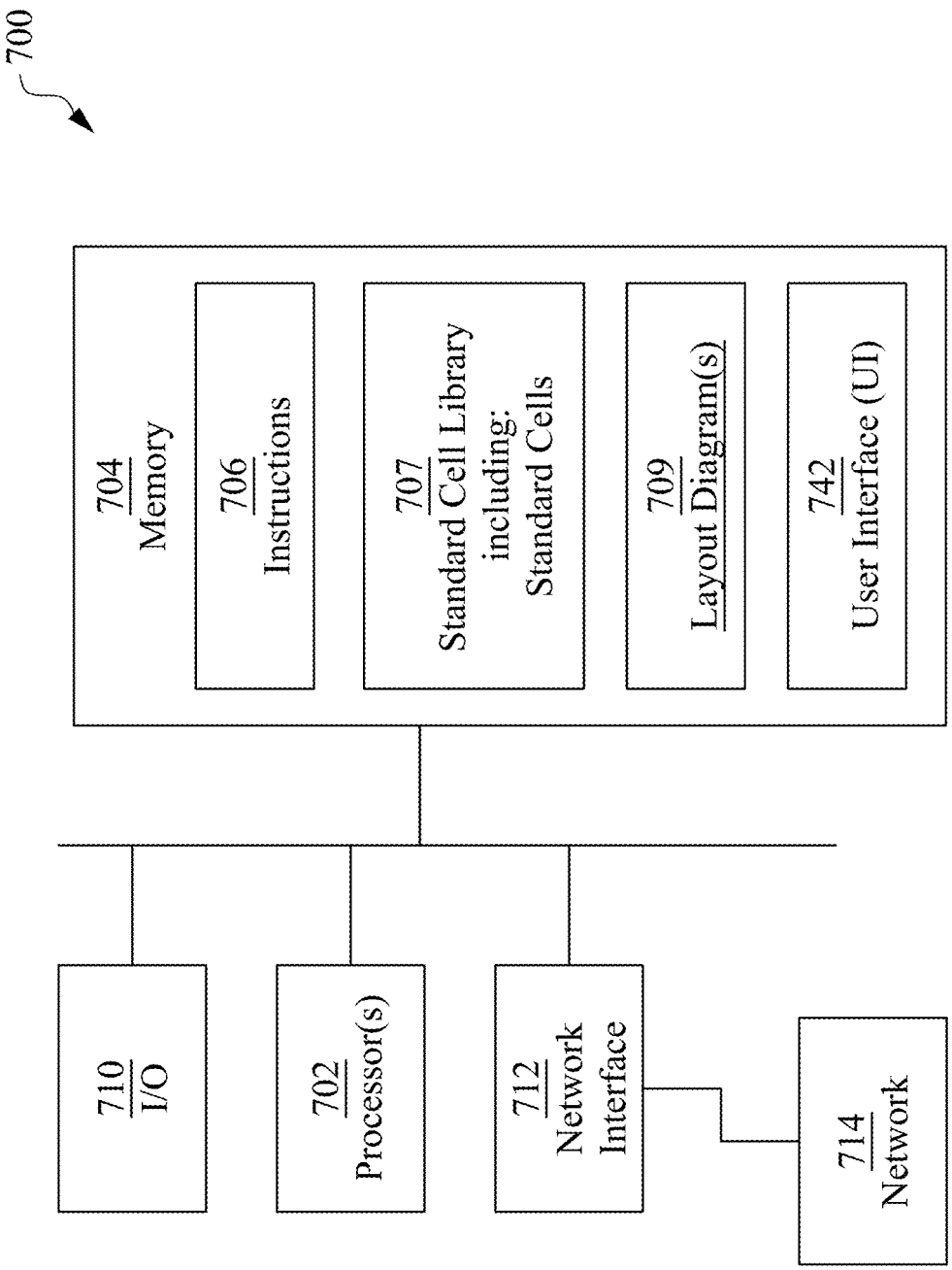
FIG. 7 is a block diagram of an electronic design automation (EDA) system, in accordance with some embodiments.

FIG. 7 is a block diagram of an electronic design automation (EDA) system 700 in accordance with some embodiments. The EDA system 700 is configured to generate a layout diagram as described above with respect to FIG. 6.

In some embodiments, EDA system 700 includes an APR system. Methods described herein of designing layout diagrams represent wire routing arrangements, in accordance with one or more embodiments, are implementable, for example, using EDA system 700, in accordance with some embodiments.

In some embodiments, EDA system 700 is a general purpose computing device including at least one processor 702, e.g., a hardware processor, and a non-transitory, computer-readable storage medium 704. Computer-readable storage medium 704, amongst other things, is encoded with, i.e., stores, computer program code 706, i.e., a set of computer-executable instructions. Execution of computer program code 706, i.e., instructions, by processor 702, e.g., a hardware processor, represents (at least in part) an EDA tool which implements a portion or all of the methods described herein in accordance with one or more embodiments (hereinafter, the noted processes and/or methods).

Computer-readable storage medium 704, amongst other things, includes layout diagram(s) 709.

Processor 702 is electrically connected to computer-readable storage medium 704 via a bus 708. Processor 702 is also electrically connected to an I/O interface 710 by bus 708. A network interface 712 is also electrically connected to processor 702 via bus 708. Network interface 712 is connected to a network 714, so that processor 702 and computer-readable storage medium 704 are capable of connecting to external elements via network 714. Processor 702 is configured to execute computer program code 706 encoded in computer-readable storage medium 704 in order to cause EDA system 700 to be usable for performing a portion or all of the noted processes and/or methods. In one or more embodiments, processor 702 is a central processing unit (CPU), a multi-processor, a distributed processing system, an application specific integrated circuit (ASIC), and/or a suitable processing unit.

In one or more embodiments, computer-readable storage medium 704 is an electronic, magnetic, optical, electromagnetic, infrared, and/or a semiconductor system (or apparatus or device). For example, computer-readable storage medium 704 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 704 includes a compact disk-read only memory (CD-ROM), a compact disk-read/write (CD-R/W), and/or a digital video disc (DVD).

In one or more embodiments, computer-readable storage medium 704 stores computer program code 706 configured to cause EDA system 700 (where such execution represents (at least in part) the EDA tool) to be usable for performing a portion or all of the noted processes and/or methods. In one or more embodiments, computer-readable storage medium 704 also stores information which facilitates performing a portion or all of the noted processes and/or methods. In one or more embodiments, computer-readable storage medium 704 stores library 707 of standard cells including such standard cells disclosed herein.

EDA system 700 includes I/O interface 710. I/O interface 710 is connected to external circuitry. In one or more embodiments, I/O interface 710 includes a keyboard, keypad, mouse, trackball, trackpad, touchscreen, and/or cursor direction keys for communicating information and commands to processor 702.

EDA system 700 also includes network interface 712 connected to processor 702. Network interface 712 allows EDA system 700 to communicate with network 714, to which one or more other computer systems are connected. Network interface 712 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more EDA systems 700.

EDA system 700 is configured to receive information through I/O interface 710. The information received through I/O interface 710 includes one or more of instructions, data, design rules, libraries of standard cells, and/or other parameters for processing by processor 702. The information is transferred to processor 702 via bus 708. EDA system 700 is configured to receive information related to a UI through I/O interface 710. The information is stored in computer-readable storage medium 704 as user interface (UI) 742.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 700. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 8:
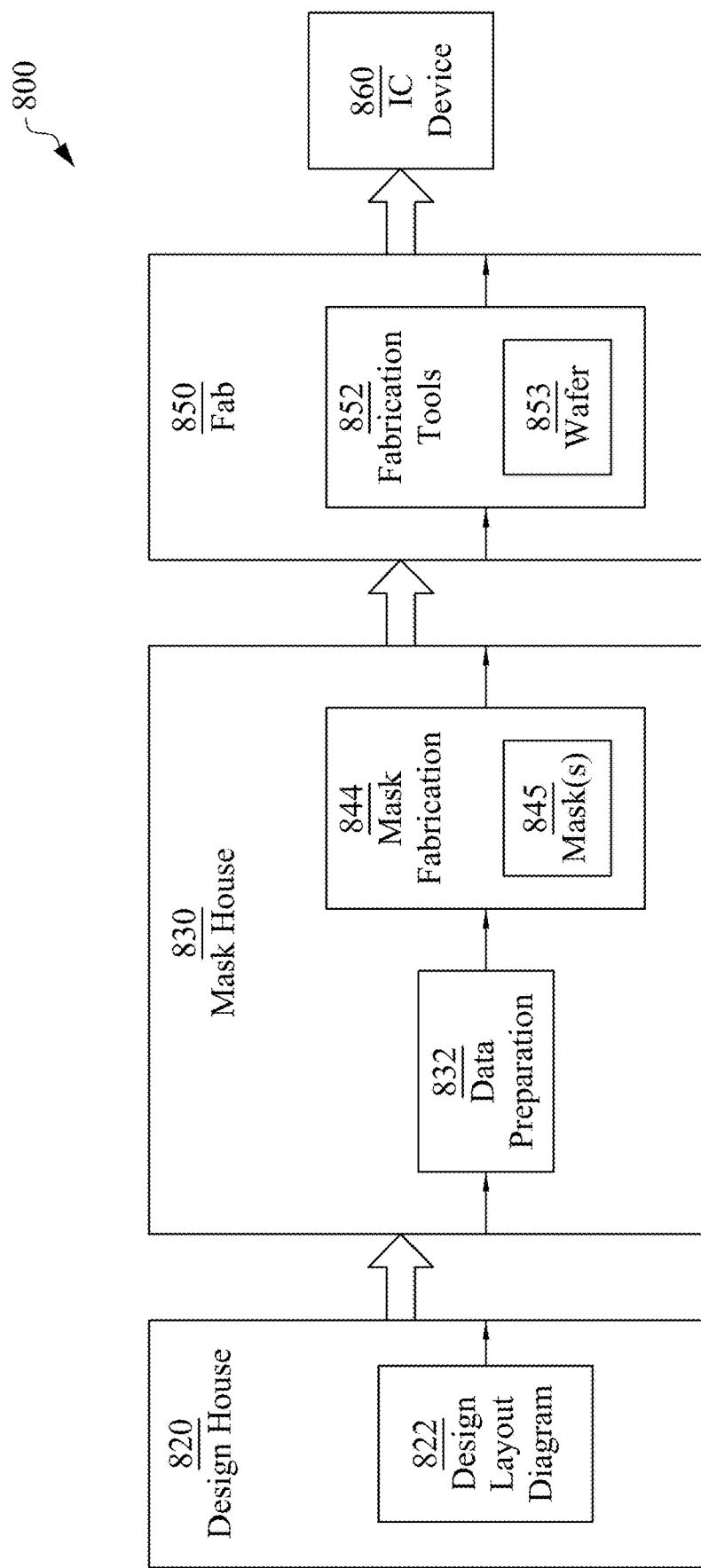
FIG. 8 is a block diagram of a semiconductor device manufacturing system, and an IC manufacturing flow associated therewith, in accordance with some embodiments.

FIG. 8 is a block diagram of the IC manufacturing system 800, and an IC manufacturing flow associated therewith, in accordance with some embodiments. The IC manufacturing system 800 is configured to manufacture the semiconductor device 100 (See FIG. 1) described above.

In some embodiments, based on a layout diagram, e.g., at least one of (A) one or more semiconductor masks or (B) at least one component in a layer of a semiconductor integrated circuit is fabricated using the IC manufacturing system 800.

In FIG. 8, the IC manufacturing system 800 includes entities, such as a design house 820, a mask house 830, and an IC manufacturer/fabricator ("fab") 850, that interact with one another in the design, development, and manufacturing cycles and/or services related to manufacturing an IC device 860. The entities in the IC manufacturing system 800 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 820, mask house 830, and IC fab 850 is owned by a single larger company. In some embodiments, two or more of design house 820, mask house 830, and IC fab 850 coexist in a common facility and use common resources.

Design house (or design team) 820 generates an IC design layout diagram 822. IC design layout diagram 822 includes various geometrical patterns designed for an IC device 860. The geometrical patterns correspond to patterns of metal, oxide, or semiconductor layers that make up the various components of IC device 860 to be fabricated. The various layers combine to form various IC features. For example, a portion of IC design layout diagram 822 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate.

Design house 820 implements a proper design procedure to form IC design layout diagram 822. The design procedure includes one or more of logic design, physical design or place and route. IC design layout diagram 822 is presented in one or more data files having information of the geometrical patterns. For example, IC design layout diagram 822 can be expressed in a GDSII file format or DFII file format.

Mask house 830 includes mask data preparation 832 and mask fabrication 844. Mask house 830 uses IC design layout diagram 822 to manufacture one or more masks 845 to be used for fabricating the various layers of IC device 860 according to IC design layout diagram 822. Mask house 830 performs mask data preparation 832, where IC design layout diagram 822 is transformed into a representative data file ("RDF"). Mask data preparation 832 provides the RDF to mask fabrication 844. Mask fabrication 844 includes a mask writer. A mask writer converts the RDF to an image on a substrate, such as a mask (reticle) 845 or a semiconductor wafer 853. The IC design layout diagram 822 is manipulated by mask data preparation 832 to comply with particular characteristics of the mask writer and/or requirements of IC fab 850. In FIG. 8, mask data preparation 832 and mask fabrication 844 are illustrated as separate elements. In some embodiments, mask data preparation 832 and mask fabrication 844 can be collectively referred to as mask data preparation.

In some embodiments, mask data preparation 832 includes optical proximity correction (OPC) which uses lithography enhancement techniques to compensate for image errors, such as those that can arise from diffraction, interference, other process effects and the like. OPC adjusts IC design layout diagram 822. In some embodiments, mask data preparation 832 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 832 includes a mask rule checker (MRC) that checks the IC design layout diagram 822 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 822 to compensate for limitations during mask fabrication 844, which may undo part of the modifications performed by OPC in order to meet mask creation rules.

In some embodiments, mask data preparation 832 includes lithography process checking (LPC) that simulates processing that will be implemented by IC fab 850 to fabricate IC device 860. LPC simulates this processing based on IC design layout diagram 822 to create a simulated manufactured device, such as IC device 860. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC may be repeated to further refine IC design layout diagram 822.

It should be understood that the above description of mask data preparation 832 has been simplified for the purposes of clarity. In some embodiments, mask data preparation 832 includes additional features such as a logic operation (LOP) to modify the IC design layout diagram 822 according to manufacturing rules. Additionally, the processes applied to IC design layout diagram 822 during mask data preparation 832 may be executed in a variety of different orders.

After mask data preparation 832 and during mask fabrication 844, a mask 845 or a group of masks 845 are fabricated based on the modified IC design layout diagram 822. In some embodiments, mask fabrication 844 includes performing one or more lithographic exposures based on IC design layout diagram 822. In some embodiments, an electron-beam (e-beam) or a mechanism of multiple e-beams is used to form a pattern on a mask (photomask or reticle) 845 based on the modified IC design layout diagram 822. Mask 845 can be formed in various technologies. In some embodiments, mask 845 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 845 includes a transparent substrate (e.g., fused quartz) and an opaque material (e.g., chromium) coated in the opaque regions of the binary mask. In another example, mask 845 is formed using a phase shift technology. In a phase shift mask (PSM) version of mask 845, various features in the pattern formed on the phase shift mask are configured to have proper phase difference to enhance the resolution and imaging quality. In various examples, the phase shift mask can be attenuated PSM or alternating PSM. The mask(s) generated by mask fabrication 844 is used in a variety of processes. For example, such a mask(s) is used in an ion implantation process to form various doped regions in semiconductor wafer 853, in an etching process to form various etching regions in semiconductor wafer 853, and/or in other suitable processes.

IC fab 850 is an IC fabrication business that includes one or more manufacturing facilities for the fabrication of a variety of different IC products. In some embodiments, IC fab 850 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 850 includes fabrication tools 852 configured to execute various manufacturing operations on semiconductor wafer 853 such that IC device 860 is fabricated in accordance with the mask(s), e.g., mask 845. In various embodiments, fabrication tools 852 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 850 uses mask(s) 845 fabricated by mask house 830 to fabricate IC device 860. Thus, IC fab 850 at least indirectly uses IC design layout diagram 822 to fabricate IC device 860. In some embodiments, semiconductor wafer 853 is fabricated by IC fab 850 using mask(s) 845 to form IC device 860. In some embodiments, the IC fabrication includes performing one or more lithographic exposures based at least indirectly on IC design layout diagram 822. Semiconductor wafer 853 includes a silicon substrate or other proper substrate having material layers formed thereon. Semiconductor wafer 853 further includes one or more of various doped regions, dielectric features, multi-level interconnects, and the like (formed at subsequent manufacturing steps).

Details regarding an integrated circuit (IC) manufacturing system (e.g., the IC manufacturing system 800 of FIG. 8), and an IC manufacturing flow associated therewith are found, e.g., in U.S. Pat. No. 9,256,709, granted Feb. 9, 2016, U.S. Pre-Grant Publication No. 2015/0278429 A1, published Oct. 1, 2015, U.S. Pre-Grant Publication No. 2014/0040838 A1, published Feb. 6, 2014, and U.S. Pat. No. 7,260,442, granted Aug. 21, 2007, the entireties of each of which are hereby incorporated by reference.

In some embodiments, a method of manufacturing a semiconductor device includes: forming active regions on a semiconductor substrate, wherein each active region of the active regions has a long axis that extends in a first direction; forming a first buried conductive rail having a long axis that extends in the first direction; forming a first set of buried conductive fingers that extends from the first buried conductive rail; each buried conductive finger in the first set of buried conductive fingers having a long axis that extends in a second direction, the second direction being substantially orthogonal to the first direction; and the first set of buried conductive fingers extending beneath more than one of the active regions; and forming a second set of buried conductive fingers; each buried conductive finger in the second set of buried conductive fingers having a long axis that extends in the second direction; the second set of buried conductive fingers extending beneath more than one of the active regions; and the second set of buried conductive fingers being interleaved with the first set of buried conductive fingers. In some embodiments, the method further includes: forming a plurality of buried contacts in rows such that the plurality of buried contacts are spaced apart in a checkered pattern; and wherein each of the active regions is connected to the buried contacts of a different row of the rows of the plurality of buried contacts. In some embodiments, the method further includes: forming a plurality of buried contacts in columns such that the plurality of buried contacts are spaced apart in a checkered pattern; and wherein each buried conductive finger in the first set of buried conductive fingers and each buried conductive finger in the second set of buried conductive fingers is connected the buried contacts of a different column of the columns of the plurality of buried contacts such that adjacent columns of the columns of the plurality of buried contacts have the buried contacts of one of the adjacent columns connected to one of the buried conductive fingers in the first set of buried conductive fingers and the buried contacts of another one of the adjacent columns connected to one of the buried conductive fingers in the second set of buried conductive fingers. In some embodiments, the first buried conductive rail and the first set of buried conductive fingers are formed in a same layer. In some embodiments, the method further includes forming a second buried conductive rail having a long axis that extends in the first direction; the first set of buried conductive fingers being between the first buried conductive rail and the second buried conductive rail. In some embodiments, the first buried conductive rail, the first set of buried conductive fingers and the second buried conductive rail are formed in a same layer. In some embodiments, the first set of buried conductive fingers is formed to create an electrical connection between the first buried conductive rail and the second buried conductive rail. In some embodiments, the first set of buried conductive fingers is formed to extend in the second direction under all active regions between the first buried conductive rail and the second buried conductive rail. In some embodiments, the first buried conductive rail, the first set of buried conductive fingers and the second set of buried conductive fingers are formed in a same layer; and the second set of buried conductive fingers is entirely spaced apart from the first buried conductive rail. In some embodiments, the method further includes forming a second buried conductive rail having a long axis that extends in the first direction; the second set of buried conductive fingers is entirely spaced apart from the second buried conductive rail. In some embodiments, the second set of buried conductive fingers is formed to extend in the second direction under all active regions between the first buried conductive rail and the second buried conductive rail. In some embodiments, the first set of buried conductive fingers is entirely spaced apart from the second set of buried conductive fingers. In some embodiments, the first set of buried conductive fingers is configured to provide a gated reference voltage; and the second set of buried conductive fingers is configured to provide an ungated reference voltage. In some embodiments, the first set of buried conductive fingers includes a first buried conductive finger and a second buried conductive finger; the second set of buried conductive fingers includes a third buried conductive finger and a fourth buried conductive finger; and the second set of buried conductive fingers is interleaved with the first set of buried conductive fingers such that, in the first direction, the third buried conductive finger is between the first and second buried conductive fingers, and the second buried conductive finger is between the third and fourth buried conductive fingers. In some embodiments, the first buried conductive rail, the first set of buried conductive fingers and the second set of buried conductive fingers are formed in a buried metal layer that is beneath the semiconductor substrate; and the method further comprises forming a metal-to-drain/source layer on an opposite side of the semiconductor substrate such that the semiconductor substrate is between the buried metal layer and the metal-to-drain/source layer.

In some embodiments, a method of manufacturing a semiconductor device includes: forming active regions on a semiconductor substrate, wherein each active region of the active regions has a long axis that extends in a first direction; forming a first buried conductive rail and a second buried conductive rail, each having a long axis that extends in the first direction; forming a first set of buried conductive fingers that extends between the first and second buried conductive rails; each buried conductive finger in the first set of buried conductive fingers having a long axis that extends in a second direction, the second direction being substantially orthogonal to the first direction; forming a second set of buried conductive fingers; each buried conductive finger in the second set of buried conductive fingers having a long axis that extends in the second direction; each buried conductive finger in the second set of buried conductive fingers having a length in the second direction that is less than a distance between the first and second buried conductive rails; and the second set of buried conductive fingers being interleaved with the first set of buried conductive fingers. In some embodiments, the first buried conductive rail, the first set of buried conductive fingers and the second set of buried conductive fingers are formed in a buried metal layer that is beneath the semiconductor substrate; and the method further comprises forming a metal-to-drain/source layer on an opposite side of the semiconductor substrate such that the semiconductor substrate is between the buried metal layer and the metal-to-drain/source layer. In some embodiments, the method further includes: forming a plurality of buried contacts in rows such that the plurality of buried contacts are spaced apart in a checkered pattern; each of the active regions being connected to the buried contacts of a different row of the rows of the plurality of buried contacts; and the plurality of buried contacts being formed in a contact-to-transistor-component layer that is between the semiconductor substrate and the buried metal layer.

In some embodiments, a method of manufacturing a semiconductor device includes: forming active regions on a semiconductor substrate, wherein each active region of the active regions has a long axis that extends in a first direction; forming a metal-to-drain/source layer on the semiconductor substrate; and forming a buried metal layer under the semiconductor substrate such that the semiconductor substrate is between the buried metal layer and the metal-to-drain/source layer; forming the buried metal layer includes forming a first buried conductive rail, a second buried conductive rail, a first set of buried conductive fingers and a second set of buried conductive fingers; the first and second buried conductive rails each being formed to have a long axis that extends in the first direction; each buried conductive finger in the first and second sets of buried conductive fingers being formed to have a long axis that extends in a second direction, the second direction being substantially orthogonal to the first direction; and the second set of buried conductive fingers being formed to be interleaved with the first set of buried conductive fingers. In some embodiments, the method further includes: forming a contact-to-transistor-component layer between the semiconductor substrate and the buried metal layer; forming the contact-to-transistor-component layer including forming a plurality of buried contacts in rows such that the plurality of buried contacts are spaced apart in a checkered pattern; and each of the active regions between the first buried conductive rail and the second buried conductive rail being connected to the buried contacts of a different row of the rows of the plurality of buried contacts.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor device, comprising:
forming active regions on a semiconductor substrate, wherein each active region of the active regions has a long axis that extends in a first direction;
forming a first buried conductive rail having a long axis that extends in the first direction;
forming a first set of buried conductive fingers that extends from the first buried conductive rail;

each buried conductive finger in the first set of buried conductive fingers having a long axis that extends in a second direction, the second direction being substantially orthogonal to the first direction; and
the first set of buried conductive fingers extending beneath more than one of the active regions; and
forming a second set of buried conductive fingers;
each buried conductive finger in the second set of buried conductive fingers having a long axis that extends in the second direction;
the second set of buried conductive fingers extending beneath more than one of the active regions; and
the second set of buried conductive fingers being interleaved with the first set of buried conductive fingers.

2. The method of claim 1, further comprising:
forming a plurality of buried contacts in rows such that the plurality of buried contacts are spaced apart in a checkered pattern; and
wherein each of the active regions is connected to the buried contacts of a different row of the rows of the plurality of buried contacts.

3. The method of claim 1, further comprising:
forming a plurality of buried contacts in columns such that the plurality of buried contacts are spaced apart in a checkered pattern; and
wherein each buried conductive finger in the first set of buried conductive fingers and each buried conductive finger in the second set of buried conductive fingers is connected the buried contacts of a different column of the columns of the plurality of buried contacts such that adjacent columns of the columns of the plurality of buried contacts have the buried contacts of one of the adjacent columns connected to one of the buried conductive fingers in the first set of buried conductive fingers and the buried contacts of another one of the adjacent columns connected to one of the buried conductive fingers in the second set of buried conductive fingers.

4. The method of claim 1, wherein the first buried conductive rail and the first set of buried conductive fingers are formed in a same layer.

5. The method of claim 1, further comprising forming a second buried conductive rail having a long axis that extends in the first direction,
the first set of buried conductive fingers being between the first buried conductive rail and the second buried conductive rail.

6. The method of claim 5, wherein the first buried conductive rail, the first set of buried conductive fingers and the second buried conductive rail are formed in a same layer.

7. The method of claim 5, wherein the first set of buried conductive fingers is formed to create an electrical connection between the first buried conductive rail and the second buried conductive rail.

8. The method of claim 5, wherein the first set of buried conductive fingers is formed to extend in the second direction under all active regions between the first buried conductive rail and the second buried conductive rail.

9. The method of claim 1, wherein:
the first buried conductive rail, the first set of buried conductive fingers and the second set of buried conductive fingers are formed in a same layer; and
the second set of buried conductive fingers is entirely spaced apart from the first buried conductive rail.

10. The method of claim 9, further comprising forming a second buried conductive rail having a long axis that extends in the first direction,
wherein the second set of buried conductive fingers is entirely spaced apart from the second buried conductive rail.

11. The method of claim 10, wherein the second set of buried conductive fingers is formed to extend in the second direction under all active regions between the first buried conductive rail and the second buried conductive rail.

12. The method of claim 1, wherein the first set of buried conductive fingers is entirely spaced apart from the second set of buried conductive fingers.

13. The method of claim 1, wherein:
the first set of buried conductive fingers is configured to provide a gated reference voltage; and
the second set of buried conductive fingers is configured to provide an ungated reference voltage.

14. The method of claim 1, wherein:
the first set of buried conductive fingers includes a first buried conductive finger and a second buried conductive finger;
the second set of buried conductive fingers includes a third buried conductive finger and a fourth buried conductive finger; and
the second set of buried conductive fingers is interleaved with the first set of buried conductive fingers such that, in the first direction, the third buried conductive finger is between the first and second buried conductive fingers, and the second buried conductive finger is between the third and fourth buried conductive fingers.

15. The method of claim 1, wherein:
the first buried conductive rail, the first set of buried conductive fingers and the second set of buried conductive fingers are formed in a buried metal layer that is beneath the semiconductor substrate; and
the method further comprises forming a metal-to-drain/source layer on an opposite side of the semiconductor substrate such that the semiconductor substrate is between the buried metal layer and the metal-to-drain/source layer.

16. A method of manufacturing a semiconductor device, comprising:
forming active regions on a semiconductor substrate, wherein each active region of the active regions has a long axis that extends in a first direction;
forming a first buried conductive rail and a second buried conductive rail, each having a long axis that extends in the first direction;
forming a first set of buried conductive fingers that extends between the first and second buried conductive rails;
each buried conductive finger in the first set of buried conductive fingers having a long axis that extends in a second direction, the second direction being substantially orthogonal to the first direction;
forming a second set of buried conductive fingers;
each buried conductive finger in the second set of buried conductive fingers having a long axis that extends in the second direction;
each buried conductive finger in the second set of buried conductive fingers having a length in the second direction that is less than a distance between the first and second buried conductive rails; and
the second set of buried conductive fingers being interleaved with the first set of buried conductive fingers.

17. The method of claim 16, wherein:
the first buried conductive rail, the first set of buried conductive fingers and the second set of buried conductive fingers are formed in a buried metal layer that is beneath the semiconductor substrate; and
the method further comprises forming a metal-to-drain/source layer on an opposite side of the semiconductor substrate such that the semiconductor substrate is between the buried metal layer and the metal-to-drain/source layer.

18. The method of claim 17, further comprising:
forming a plurality of buried contacts in rows such that the plurality of buried contacts are spaced apart in a checkered pattern;
each of the active regions being connected to the buried contacts of a different row of the rows of the plurality of buried contacts; and
the plurality of buried contacts being formed in a contact-to-transistor-component layer that is between the semiconductor substrate and the buried metal layer.

19. A method of manufacturing a semiconductor device, comprising:
forming active regions on a semiconductor substrate, wherein each active region of the active regions has a long axis that extends in a first direction;
forming a metal-to-drain/source layer on the semiconductor substrate; and
forming a buried metal layer under the semiconductor substrate such that the semiconductor substrate is between the buried metal layer and the metal-to-drain/source layer;
wherein forming the buried metal layer includes forming a first buried conductive rail, a second buried conductive rail, a first set of buried conductive fingers and a second set of buried conductive fingers;
the first and second buried conductive rails each being formed to have a long axis that extends in the first direction;
each buried conductive finger in the first and second sets of buried conductive fingers being formed to have a long axis that extends in a second direction, the second direction being substantially orthogonal to the first direction; and
the second set of buried conductive fingers being formed to be interleaved with the first set of buried conductive fingers.

20. The method of claim 19, further comprising:
forming a contact-to-transistor-component layer between the semiconductor substrate and the buried metal layer;
forming the contact-to-transistor-component layer including forming a plurality of buried contacts in rows such that the plurality of buried contacts are spaced apart in a checkered pattern; and
each of the active regions between the first buried conductive rail and the second buried conductive rail being connected to the buried contacts of a different row of the rows of the plurality of buried contacts.

* * * * *